US012706059B2

(12) United States Patent
Kim et al.

(10) Patent No.: US 12,706,059 B2
(45) Date of Patent: Aug. 11, 2026

(54) DISPLAY DEVICE

(71) Applicant: Samsung Display Co., Ltd., Yongin-Si (KR)

(72) Inventors: Kwi Hyun Kim, Yongin-si (KR); Se Hyun Lee, Yongin-si (KR); Jin Joo Ha, Yongin-si (KR)

(73) Assignee: Samsun Display Co., Ltd., Yongin-si (KR)

( * ) Notice: Subject to any disclaimer, the term of this patent is extended or adjusted under 35 U.S.C. 154(b) by 0 days.

(21) Appl. No.: 18/589,449

(22) Filed: Feb. 28, 2024

(65) Prior Publication Data

US 2025/0029566 A1 Jan. 23, 2025

(30) Foreign Application Priority Data

Jul. 17, 2023 (KR) ........................ 10-2023-0092568

(51) Int. Cl.
*G09G 3/3291* (2016.01)
*G09G 3/32* (2016.01)

(52) U.S. Cl.
CPC ............. *G09G 3/3291* (2013.01); *G09G 3/32* (2013.01); *G09G 2300/0426* (2013.01); *G09G 2300/0852* (2013.01); *G09G 2310/0275* (2013.01); *G09G 2310/08* (2013.01); *G09G 2330/10* (2013.01)

(58) Field of Classification Search
CPC ................... G09G 3/3291; G09G 3/32; G09G 2300/0426; G09G 2300/0852; G09G 2310/0275; G09G 2310/08; G09G 2330/10; G09G 3/3233; G09G 3/006; G09G 3/3266
See application file for complete search history.

(56) References Cited

U.S. PATENT DOCUMENTS

| | | | | |
|---|---|---|---|---|
| 8,723,761 | B2 | 5/2014 | Uchino et al. | |
| 9,066,408 | B2 * | 6/2015 | Choi | G09G 3/006 |
| 11,769,447 | B2 * | 9/2023 | Lee | G09G 3/32 345/76 |
| 2005/0168491 | A1 * | 8/2005 | Takahara | H10K 59/88 345/690 |
| 2009/0284511 | A1 * | 11/2009 | Takasugi | G09G 3/3283 345/76 |

(Continued)

FOREIGN PATENT DOCUMENTS

| | | |
|---|---|---|
| KR | 10-2256360 B1 | 5/2021 |
| KR | 10-2023-0037786 A | 3/2023 |

OTHER PUBLICATIONS

Kei Kimura et al., "New Pixel Driving Circuit Using Self-Discharging Compensation Method for High-Resolution OLED Micro Displays on a Silicon Backplane", Journal of the SID, 2017, 10 pages.

*Primary Examiner* — Ibrahim A Khan
(74) *Attorney, Agent, or Firm* — Innovation Counsel LLP

(57) ABSTRACT

The present disclosure relates to a display device, and more particularly, to a display device that can determine whether pixels are defective. According to an embodiment of the disclosure, a display device comprising: a light-emitting element; a driving transistor connected between a driving voltage line and an anode electrode of the light-emitting element; and a fifth transistor connected between the anode electrode of the light-emitting element and a sensing line, wherein the fifth transistor always remains turned off during normal operation of the display device.

11 Claims, 28 Drawing Sheets

(56) References Cited

U.S. PATENT DOCUMENTS

| | | | | |
|---|---|---|---|---|
| 2014/0197744 | A1* | 7/2014 | Choi | G09G 3/3233<br>315/130 |
| 2014/0292623 | A1* | 10/2014 | Moon | G09G 3/3233<br>345/82 |
| 2014/0292827 | A1* | 10/2014 | Kang | G09G 3/3233<br>345/76 |
| 2016/0005354 | A1* | 1/2016 | Takasugi | G09G 3/3291<br>345/207 |
| 2016/0140897 | A1* | 5/2016 | Park | G09G 3/3233<br>345/77 |
| 2016/0335955 | A1* | 11/2016 | Cho | G09G 3/3233 |
| 2017/0032722 | A1* | 2/2017 | Wang | G09G 3/3266 |
| 2017/0193901 | A1* | 7/2017 | Wang | G09G 3/3233 |
| 2019/0189038 | A1* | 6/2019 | Park | G09G 3/3225 |
| 2021/0201767 | A1* | 7/2021 | Park | G09G 3/32 |
| 2022/0020947 | A1* | 1/2022 | Park | G09G 5/005 |
| 2022/0199038 | A1* | 6/2022 | Kim | G09G 3/3291 |
| 2022/0277692 | A1 | 9/2022 | Azizi et al. | |
| 2022/0406253 | A1 | 12/2022 | Yuan et al. | |
| 2023/0078752 | A1* | 3/2023 | Yu | G09G 3/006<br>345/694 |
| 2023/0116660 | A1* | 4/2023 | Kim | G09G 3/3291<br>345/76 |
| 2023/0145805 | A1* | 5/2023 | Kim | G09G 3/2096<br>345/691 |
| 2023/0215307 | A1* | 7/2023 | Hwang | G09G 3/006<br>345/204 |
| 2024/0257760 | A1* | 8/2024 | Lee | G09G 3/3233 |

* cited by examiner

DISPLAY DEVICE

REFERENCE TO RELATED APPLICATION

This application claims priority from Korean Patent Application No. 10-2023-0092568 filed on Jul. 17, 2023, in the Korean Intellectual Property Office, the disclosure of which is incorporated herein by reference in its entirety.

BACKGROUND

Field of the Disclosure

The present disclosure relates to a display device, and more particularly, to a display device that can determine whether pixels are defective.

Description of the Related Art

An organic light-emitting display apparatus includes display elements, for example, organic light-emitting diodes, having luminance varying depending on electric current.

SUMMARY

A display device in accordance with an embodiment described in the present disclosure may determine whether pixels are defective. However, embodiments in accordance with the present disclosure are not restricted to the specific examples set forth herein. The features and aspects of the present disclosure will become more apparent to one of ordinary skill in the art to which the present disclosure pertains by referencing the detailed description given below.

According to an embodiment of the disclosure, a display device may comprise: a light-emitting element; a driving transistor connected between a driving voltage line and an anode electrode of the light-emitting element; and a fifth transistor connected between the anode electrode of the light-emitting element and a sensing line, wherein the fifth transistor always remains turned off. In particular, the fifth transistor may always remain off during normal operation of the display device and only be turned on when testing for defective pixels in the display device, e.g., during fabrication or testing of the display device.

An embodiment may further comprises: a second transistor connected between a data line and a gate electrode of the driving transistor; a third transistor connected between the driving voltage line and a source electrode of the driving transistor; a fourth transistor connected between an initialization line and the anode electrode of the light-emitting element; a first capacitor connected between the gate electrode of the driving transistor and the source electrode of the driving transistor; and a second capacitor connected between the gate electrode of the driving transistor and the anode electrode of the light-emitting element.

An embodiment may further comprise: a first gate line connected to a gate electrode of the second transistor; an emission line connected to a gate electrode of the third transistor; a second gate line connected to a gate electrode of the fourth transistor; and a third gate line connected to a gate electrode of the fifth transistor.

In an embodiment, a third gate signal of the third gate line has a non-active level.

In an embodiment, in an initialization/write period, an emission signal of the emission line, a first gate signal of the first gate line, and a second gate signal of the second gate line each have an active level, while a third gate signal of the third gate line has a non-active level, wherein in a compensation period, the first gate signal and the second gate signal each have the active level, while the emission signal and the third gate signal each have the non-active level, wherein in a bypass period, the emission signal and the second gate signal each have the active level, while the first gate signal and the third gate signal each have the non-active level, and wherein in an emission period, the emission signal has the active level, while the first gate signal and the second gate signal each have the non-active level.

In an embodiment, a previous data voltage is applied to the data line in the initialization/write period and the compensation period, wherein a current data voltage is applied to the data line in the emission period, and wherein a transient voltage transitioning from the previous data voltage to the current data voltage is applied to the data line in the bypass period.

An embodiment may further comprise a detector or a power supply unit connected to the sensing line.

According to an embodiment of the disclosure, a display device comprises: a light-emitting element; a driving transistor connected between a driving voltage line and an anode electrode of the light-emitting element; a second transistor connected between a data line and a gate electrode of the driving transistor; a third transistor connected between the driving voltage line and a source electrode of the driving transistor; and a fourth transistor connected between an initialization/sensing line and the anode electrode of the light-emitting element.

An embodiment may further comprise: a first capacitor connected between the gate electrode of the driving transistor and the source electrode of the driving transistor; and a second capacitor connected between the gate electrode of the driving transistor and the anode electrode.

An embodiment may further comprise: a first gate line connected to a gate electrode of the second transistor; an emission line connected to a gate electrode of the third transistor; and a second gate line connected to a gate electrode of the fourth transistor.

In an embodiment, in an initialization/write period, an emission signal of the emission line, a first gate signal of the first gate line, and a second gate signal of the second gate line each have an active level, wherein in a compensation period, the first gate signal and the second gate signal each have an active level, wherein in a bypass period, the emission signal and the second gate signal each have the active level, and the first gate signal has a non-active level, and wherein in an emission period, the emission signal has the active level, and the first gate signal, the second gate signal, and the third gate signal each have the non-active level.

In an embodiment, a previous data voltage is applied to the data line in the initialization/write period and the compensation period, wherein a current data voltage is applied to the data line in the emission period, and wherein a transient voltage transitioning from the previous data voltage to the current data voltage is applied to the data line in the bypass period.

According to an embodiment of the disclosure, a display device may comprise: a light-emitting element; a driving transistor connected between a driving voltage line and an anode electrode of the light-emitting element; a first capacitor comprising a first electrode connected to a gate electrode of the driving transistor; a second transistor connected to a data line and a second electrode of the first capacitor; and a fifth transistor connected between the anode electrode of the light-emitting element and a sensing line, wherein the fifth transistor always remains turned off.

An embodiment may further comprise: a sixth transistor connected between the gate electrode of the driving transistor and a drain electrode of the driving transistor; a seventh transistor connected between the drain electrode of the driving transistor and the anode electrode of the light-emitting element; a fourth transistor connected between an initialization line and the anode electrode of the light-emitting element; a third transistor connected between the driving voltage line and a source electrode of the driving transistor; and a second capacitor connected between the driving voltage line and the gate electrode of the driving transistor.

An embodiment may further comprises: a first gate line connected to a gate electrode of the second transistor; a second gate line connected to a gate electrode of the fourth transistor; an emission line connected to a gate electrode of the third transistor and a gate electrode of the seventh transistor; a third gate line connected to a gate electrode of the fifth transistor; and a fourth gate line connected to a gate electrode of the sixth transistor.

In an embodiment, a fourth gate signal of the fourth gate line has a non-active level.

An embodiment may further comprise a detector connected to the sensing line.

According to an embodiment of the disclosure, a display device may comprise: a light-emitting element; a driving transistor connected between a driving voltage line and an anode electrode of the light-emitting element; a second transistor connected between a data line and a gate electrode of the driving transistor; a third transistor connected between the driving voltage line and a source electrode of the driving transistor; a fourth transistor connected between an initialization line and the anode electrode of the light-emitting element; and a fifth transistor connected between the anode electrode of the light-emitting element and a sensing line.

An embodiment may further comprise: a first capacitor connected between the gate electrode of the driving transistor and the source electrode of the driving transistor; and a second capacitor connected between the gate electrode of the driving transistor and the anode electrode.

In an embodiment, the fifth transistor always remains turned off.

An embodiment may further comprise a detector or a power supply unit connected to the sensing line.

According to an embodiment of the present disclosure, it is possible to determine pixels are defective by receiving a sensing voltage from a pixel through a sensing line and a transistor to determine whether the pixel is defective based on the sensing voltage.

BRIEF DESCRIPTION OF THE DRAWINGS

The above and other aspects and features of the present disclosure will become more apparent by describing in detail exemplary embodiments thereof with reference to the attached drawings.

DETAILED DESCRIPTION OF THE EMBODIMENTS

Figure 1:
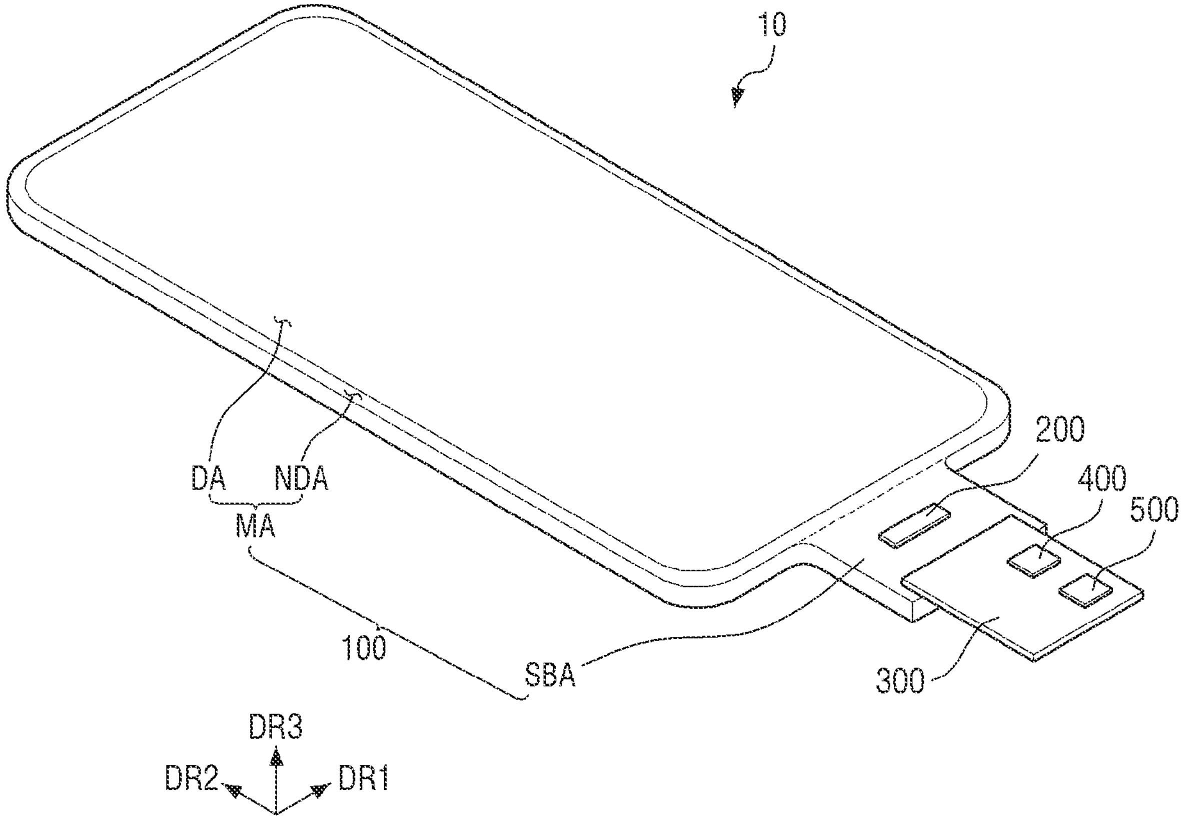
FIG. 1 is a perspective view showing a display device according to an embodiment of the present disclosure.

Advantages and features of the present disclosure and methods to achieve them will become apparent from the descriptions of embodiments hereinbelow with reference to the accompanying drawings. However, the present disclosure is not limited to the specific embodiments disclosed herein but may be implemented in various different ways. Some specific embodiments are described in detail to make the present disclosure thorough and to convey the scope of the present disclosure to those skilled in the art. It is to be noted that the scope of the present disclosure is defined only by the claims.

As used herein, a phrase "an element A on an element B" refers to that the element A may be disposed directly on the element B and/or the element A may be disposed indirectly on the element B via another element C. Like reference numerals denote like elements throughout the descriptions. The figures, dimensions, ratios, angles, numbers of elements given in the drawings are merely illustrative and are not limiting.

Although terms such as first, second, etc. are used to distinguish between elements such terms are not necessarily intended to indicate temporal or other prioritization of such elements. These terms are used to merely distinguish one element from another. Accordingly, as used herein, a first element may be a second element within the technical scope of the present disclosure.

Features of various exemplary embodiments of the present disclosure may be combined partially or totally. As will be clearly appreciated by those skilled in the art, technically various interactions and operations are possible. Various embodiments disclosed herein may be practiced individually or in combination.

Hereinafter, embodiments of the present disclosure will be described with reference to the accompanying drawings.

FIG. 1 is a perspective view showing a display device according to an embodiment of the present disclosure.

Referring to FIG. 1, a display device 10 may be employed by or in portable electronic devices such as a mobile phone, a smart phone, a tablet PC, a mobile communications terminal, an electronic notebook, an electronic book, a portable multimedia player (PMP), a navigation device or an ultra mobile PC (UMPC). The display device 10 may also be employed by or in a television, a laptop computer, a monitor, an electronic billboard, or the Internet of Things (IOT). Further, the display device 10 may be employed by or in wearable devices such as a smart watch, a watch phone, a glasses-type display, and a head-mounted display (HMD) device.

The display device 10 may have a shape similarly to a quadrangular shape when viewed from the top. For example, the display device 10 may have a shape similar to a rectangle having shorter sides that extend in a first direction DR1 and longer sides that extend in a second direction DR2. The corners where the shorter sides meet the longer sides may be rounded with a predetermined curvature or may be right angles. The display device 10 when viewed from the top is not limited to a quadrangular shape but may have any shape such as a shape similar to another polygonal shape, a circular shape, or an elliptical shape.

The display device 10 may include a display panel 100, a display driver 200, a circuit board 300, a touch driver 400, and a power supply unit 500.

The display panel 100 may include a main area MA and a subsidiary area SBA.

The main area MA may include a display area DA having pixels for displaying images and a non-display area NDA located around the display area DA. The display area DA may output light from a plurality of emission areas or a plurality of open areas. For example, the display panel 100 may include a pixel-defining layer that defines the emission areas or the opening areas, each area corresponding to a self-light-emitting element LEL connected to a pixel circuit including switching elements. The self-light-emitting element LEL may include, for example, at least one of: an organic light-emitting diode including an organic emissive layer, a quantum-dot light-emitting diode (quantum LED) including a quantum-dot emissive layer, an inorganic light-emitting diode (inorganic LED) including an inorganic semiconductor, and a micro light-emitting diode (micro LED).

The non-display area NDA may be disposed on the outer side or perimeter of the display area DA. The non-display area NDA may be defined as the edge area of the main area MA of the display panel 100. The non-display area NDA may include a gate driver (not shown) that applies gate signals to gate lines, and fan-out lines (not shown) that connect the display driver 200 with the display area DA.

The subsidiary area SBA may extend from one side of the main area MA. The subsidiary area SBA may include a flexible material that can be bent, folded, or rolled. For example, when the subsidiary area SBA is bent, the subsidiary area SBA may overlap with the main area MA in the thickness direction (e.g., a third direction DR3). The subsidiary area SBA may include pads connected to the display driver 200 and the circuit board 300. Optionally, the subsidiary area SBA may be eliminated, and the display driver 200, and the pads may be disposed in the non-display area NDA.

The display driver 200 may output signals and voltages for driving the display panel 100. The display driver 200 may supply data voltages to data lines DL. The display driver 200 may apply a supply voltage to a voltage line and may supply gate control signals to the gate driver. The display driver 200 may be implemented as an integrated circuit (IC) and may be attached on the display panel 100 using a chip-on-glass (COG) technique, a chip-on-plastic (COP) technique, or ultrasonic bonding. For example, the display driver 200 may be disposed in the subsidiary area SBA and may overlap with or underlie the main area MA in the thickness direction (third direction DR3) when the subsidiary area SBA is bent. For another example, the display driver 200 may be mounted on the circuit board 300.

The circuit board 300 may be attached to the pad area of the display panel 100 using an anisotropic conductive film (ACF). Lead lines of the circuit board 300 may be electrically connected to the pads of the display panel 300. The circuit board 300 may be a flexible printed circuit board (FPCB), a printed circuit board (PCB), or a flexible film such as a chip-on-film (COF).

The touch driver 400 may be mounted on the circuit board 300.

The power supply unit 500 may be on the circuit board 300 and connected to apply a supply voltage to the display drivers 200 and the display panel 100. More specifically, the power supply unit 500 may generate a driving voltage to supply the driving voltage to a driving voltage line VDL and may generate a common voltage to supply the common voltage to a common electrode shared by the light-emitting elements of a plurality of pixels. For example, the driving voltage may be a high-level voltage for driving the light-emitting element, and the common voltage may be a low-level voltage for driving the light-emitting element.

Figure 2:
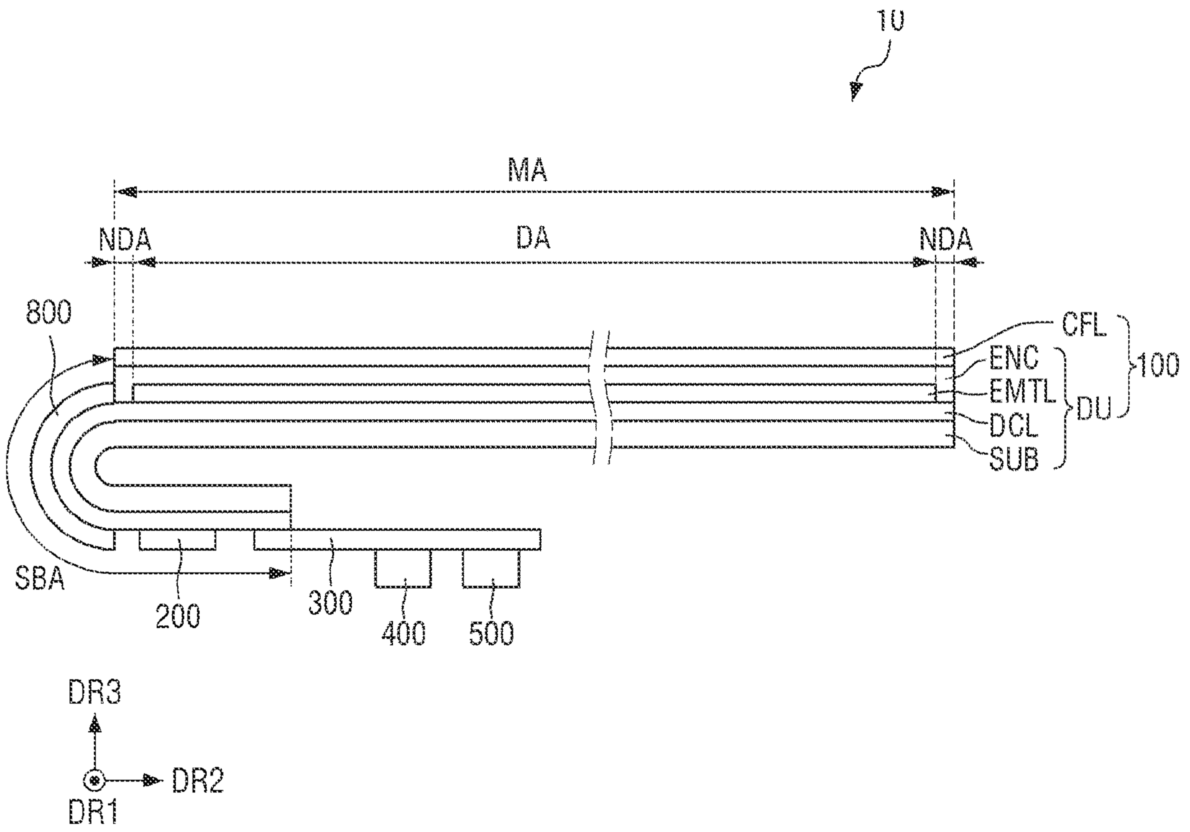
FIG. 2 is a cross-sectional view showing a display device according to an embodiment of the present disclosure.

FIG. 2 is a cross-sectional view showing a display device according to an embodiment of the present disclosure.

Referring to FIG. 2, the display panel 10 may include a display unit DU and a color filter layer CFL. The display unit DU may include a substrate SUB, a driver circuit layer DCL, an emission material layer EMTL, and an encapsulation layer ENC.

The substrate SUB may be a base substrate or a base member. The substrate SUB may be a flexible substrate that can be bent, folded, or rolled. For example, the substrate SUB may include, but is not limited to, a polymer resin such as polyimide PI. For another example, the substrate SUB may include a glass material or a metal material.

The driver circuit layer DCL may be disposed on the substrate SUB. The driver circuit layer DCL may include a plurality of transistors. The driver circuit layer DCL may include gate lines, data lines DL, voltage lines, gate control lines, fan-out lines for connecting the display driver 200 with the data lines DL, and lead lines for connecting the display driver 200 with the pads. Each of the transistors may include a semiconductor region, a source electrode, a drain electrode, and a gate electrode. For example, when the gate driver is formed on one side of the non-display area NDA of the display panel 100, the gate driver may include transistors formed in the driver circuit layer DCL.

The driver circuit layer DCL may be disposed in the display area DA, the non-display area NDA and the subsidiary area SBA. The transistors of the pixels, the gate lines, the data lines DL, and the voltage lines in the driver circuit layer DCL may be disposed in the display area DA. The gate control lines and the fan-out lines in the driver circuit layer DCL may be disposed in the non-display area NDA. Lead lines of the driver circuit layer DCL may be disposed in the subsidiary area SBA.

The emission material layer EML may be disposed on the driver circuit layer PCL. The emission material layer EMTL may include a plurality of light-emitting elements ED. See, for example, FIG. 6. Each light-emitting element ED may include a pixel electrode, an emissive layer and a common electrode stacked on one another sequentially to emit light. The emission material layer EMTL may further include a pixel-defining film for defining light-emitting areas of the pixels. The plurality of light-emitting elements ED in the emission material layer EMTL may be disposed in the display area DA.

The emissive layer may, for example, be an organic emissive layer containing an organic material. The emissive layer may include a hole transporting layer, an organic light-emitting layer and an electron transporting layer. When the pixel electrode receives a voltage through the transistors of the driver circuit layer DCL and the common electrode receives a different voltage, holes and electrons may move to the organic light-emitting layer through the hole transporting layer and the electron transporting layer, respectively, such that the electrons and holes combine in the organic light-emitting layer to emit light. For example, the pixel electrode may be an anode electrode while the common electrode may be a cathode electrode. It is, however, to be understood that the present disclosure is not limited thereto.

As another example, the light-emitting elements ED may include quantum-dot light-emitting diodes each including a quantum-dot emissive layer, inorganic light-emitting diodes each including an inorganic semiconductor, or micro light-emitting diodes.

The encapsulation layer ENC may cover the upper and side surfaces of the emission material layer EMTL and may protect the emission material layer EMTL. The encapsulation layer ENC may include at least one inorganic layer and at least one organic layer for encapsulating the emission material layer EMTL.

The color filter layer CFL may be disposed on the encapsulation layer ENC. The color filter layer CFL may include a plurality of color filters associated with the plurality of emission areas, respectively. Each of the color filters may selectively transmit light of a particular wavelength or in a particular wavelength band and block or absorb light of other wavelengths. The color filter layer CFL may absorb some of light introduced from the outside of the display device 10 to reduce the reflection of external light. Accordingly, the color filter layer CFL can prevent distortion of colors due to the reflection of external light.

The subsidiary area SBA of the display panel 100 may extend from one side or edge of the main area MA. The subsidiary area SBA may include a flexible material that can be bent, folded, or rolled. For example, when the subsidiary area SBA is bent, the subsidiary area SBA may overlap with the main area MA in the thickness direction (third direction DR3) as shown in FIG. 2. The subsidiary area SBA may include pads electrically connected to the display driver 200 and the circuit board 300.

When the subsidiary area SBA is bent, a protective layer 800 may be further disposed on a bent portion of the subsidiary area SBA as shown in FIG. 2.

Figure 3:
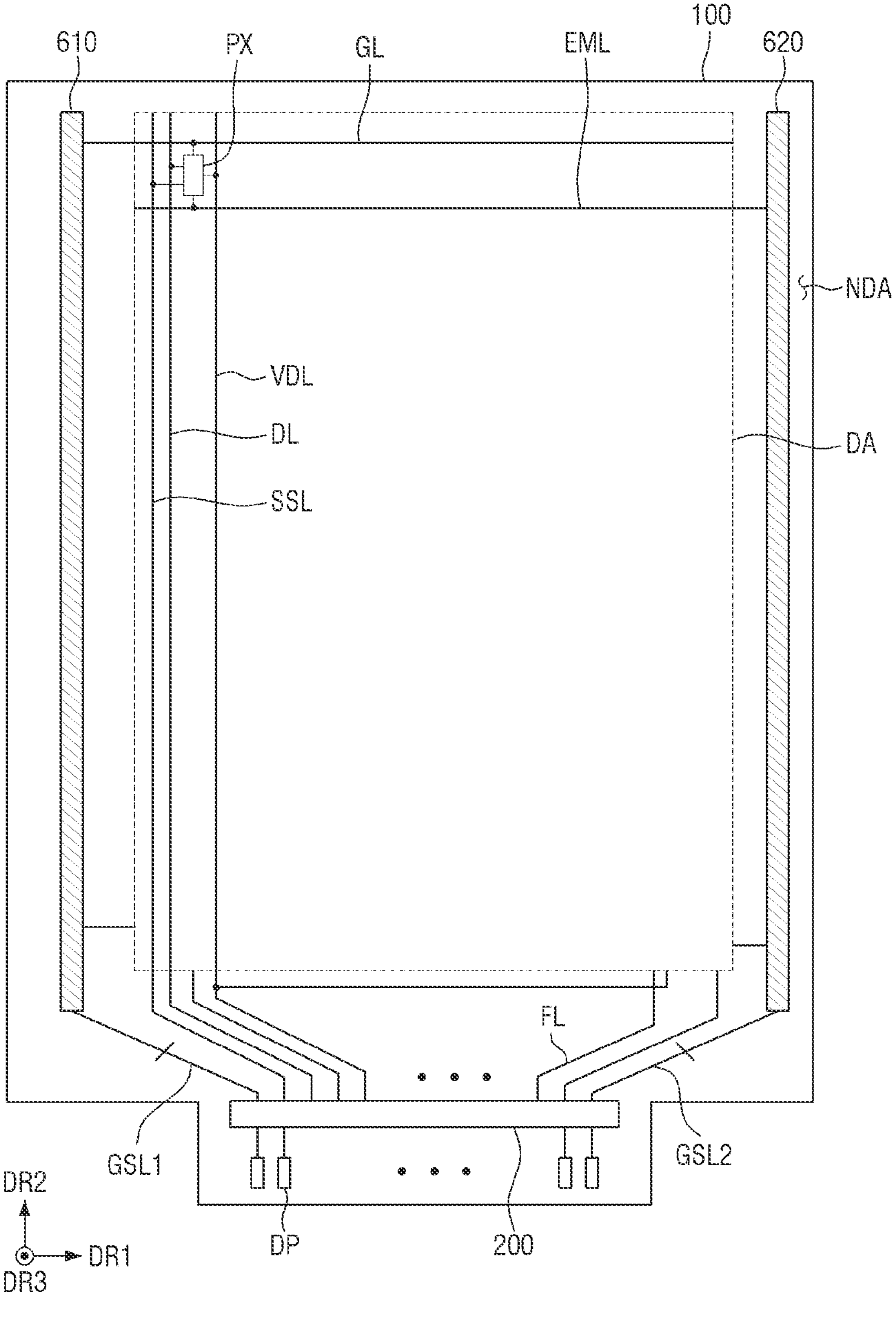
FIG. 3 is a plan view showing a display unit of a display device according to an embodiment of the present disclosure.
Figure 4:
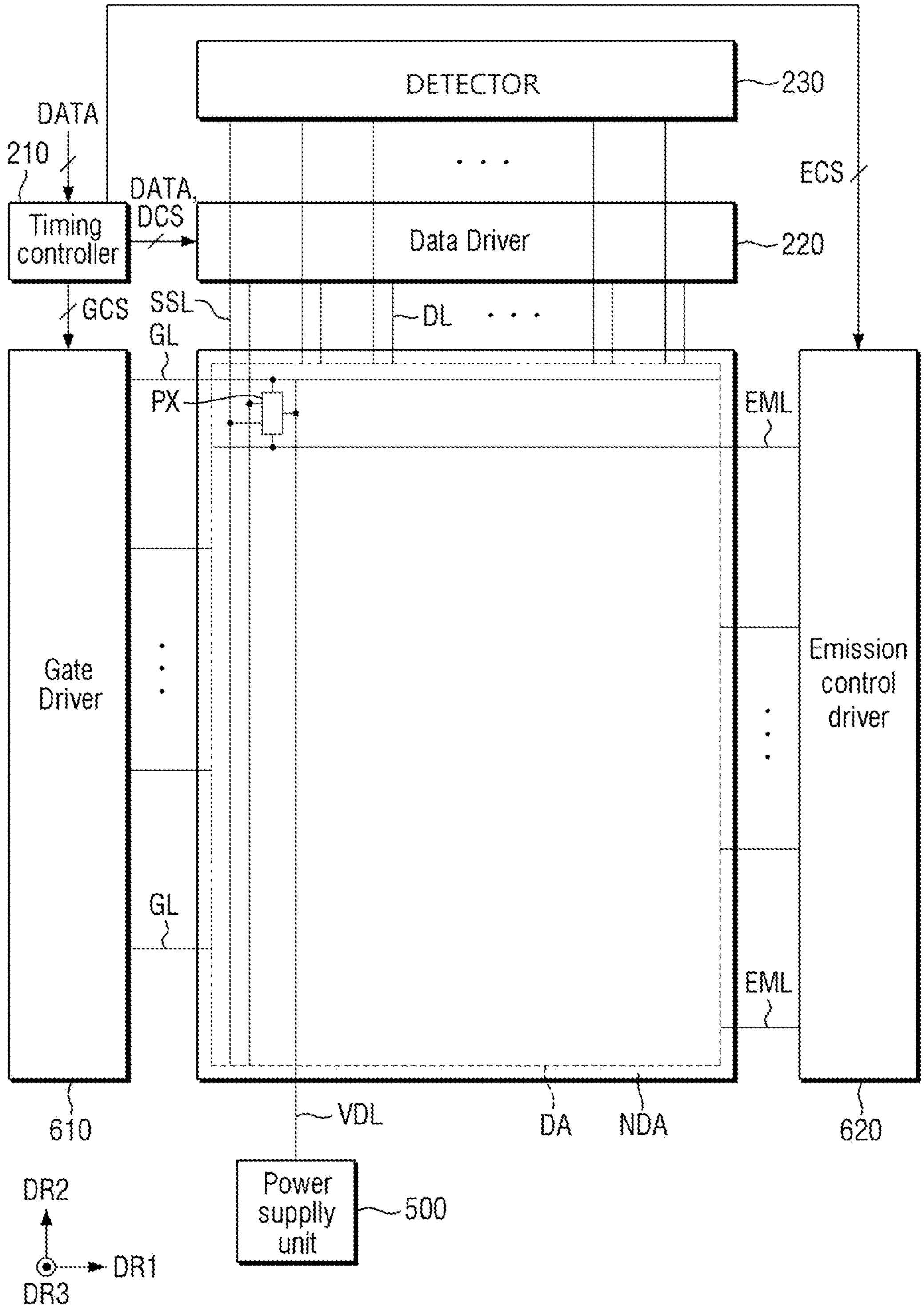
FIG. 4 is a block diagram illustrating the display panel and the display driver according to an embodiment of the present disclosure.

FIG. 3 is a plan view showing the display unit of the display device according to the embodiment of the present disclosure. FIG. 4 is a block diagram illustrating the display panel and the display driver according to an embodiment.

Referring to FIGS. 3 and 4, the display panel 100 may include the display area DA and the non-display area NDA.

The display area DA may include a plurality of pixels PX and a plurality of signal transmission lines connected to the plurality of pixels PX. The plurality of signal transmission lines may include a plurality of gate lines GL, a plurality of emission lines EML, a plurality of data lines DL, a plurality of sensing signal lines SSL, a plurality of driving voltage lines VDL, and a plurality of common voltage lines VSL (see FIG. 6). A plurality of fan-out lines FL may connect to the above-described lines.

Each of the plurality of pixels PX may be connected to a gate line, a data line DL, a sensing line SSL, an emission line EML, a driving voltage line VDL, and a common voltage line VSL. Each of the plurality of pixels PX may include at least one transistor, a light-emitting element ED, and a capacitor.

The gate lines GL may extend in the first direction DR1 and may be spaced apart from one another in the second direction DR2, which crosses the first direction DR1. The gate lines GL may be arranged or spaced apart along the second direction DR2. The gate lines may sequentially supply gate signals to the plurality of pixels PX.

The emission lines EML may extend in the first direction DR1 and may be spaced apart from one another in the second direction DR2. The emission lines EML may thus be arranged along the second direction DR2. The emission lines EML may sequentially supply emission signals EM to the pixels PX.

The data lines DL may extend in the second direction DR2 and may be spaced apart from one another along the first direction DR1. The data lines DL may thus be arranged along the first direction DR1. The data lines DL may supply data voltages to the pixels PX. The data voltage may determine the luminance of each of the plurality of pixels PX.

The sensing lines SSL may extend in the second direction DR2 and may be spaced apart from one another in the first direction DR1. The sensing lines SSL may thus be arranged or distributed along the first direction DR1. One sensing line SSL may be commonly connected to pixels PX arranged in a column that extends in the second direction DR2. The plurality of sensing lines SSL may be respectively connected to a plurality of columns of the pixels PX. For example, the pixels in a first column may be commonly connected to a first sensing line SSL, the pixels in a second column may be commonly connected to a second sensing line SSL, and the pixels in a third column may be commonly connected to a third sensing line SSL. The sensing lines SSL may not be connected with one another. The sensing lines SSL may provide sensing voltages Vs from the pixels PX to a detector 230. To this end, the sensing lines SSL may be connected to the detector 230.

The driving voltage lines VDL may extend in the second direction DR2 and may be spaced apart from one another in the first direction DR1. The driving voltage lines VDL may thus be arranged in the first direction DR1. The driving voltage lines VDL may supply one or more driving voltages to the pixels PX. The driving voltages may be high-level voltages for driving light-emitting elements ED of the pixels PX.

The non-display area NDA may surround the display area DA. The non-display area NDA may include a gate driver 610, an emission control driver 620, the fan-out lines FL, a first gate control line GSL1 and a second gate control line GSL2.

The fan-out lines FL may extend from the display driver 200 to the display area DA. The fan-out lines FL may supply the data voltages received from the display driver 200 to the plurality of data lines DL.

The first gate control line GSL1 may extend from the display driver 200 to the gate driver 610. The first gate control line GSL1 may supply the gate control signal GCS from the display driver 200 to the gate driver 610.

The second gate control line GSL2 may extend from the display driver 200 to the emission control driver 620. The second gate control line GSL2 may supply the emission control signal ECS from the display driver 200 to the emission control driver 620.

The subsidiary area SBA may extend from one side or edge of the non-display area NDA. The subsidiary area SBA may include the display driver 200 and pads DP. The pads DP may be disposed closer to one edge of the subsidiary area SBA than the display driver 200. The pads DP may be electrically connected to the circuit board 300 through an anisotropic conductive film ACF.

The display driver 200 may include a timing controller 210 and a data driver 220 as shown in FIG. 4.

The timing controller 210 may receive digital video data signals DATA and timing signals from the circuit board 300. Based on the timing signals, the timing controller 210 may generate a data control signal DCS to control the operation timing of the data driver 220, may generate a gate control signal GCS to control the operation timing of the gate driver 610, and may generate an emission control signal ECS to control the operation timing of the emission control driver 620. The timing controller 210 may supply the gate control signal GCS to the gate driver 610 through the first gate control line GSL1. The timing controller 210 may supply the emission control signal ECS to the emission control driver 620 through the second gate control line GSL2. The timing controller 210 may supply the digital video data signal DATA and the data control signal DCS to the data driver 220.

The data driver 220 may convert the digital video data signal DATA into analog data voltages and may supply them to the data lines DL through the fan-out lines FL. The gate signals from the gate driver 610 may be used to select pixels PX to which a data voltage is applied, and the selected pixels PX may receive the data voltage through the data lines DL.

The detector 230 may detect the sensing voltages Vs from the pixels PX through the sensing lines SSL. For example, the detector 230 may convert sensing currents supplied through the sensing lines SSL into voltages (e.g., sensing voltages Vs), may compare the sensing voltages Vs with a predetermined criterion voltage, and may determine whether pixels are defective based on the comparison results.

The power supply unit 500 may be disposed on the circuit board 300 to supply power to the display drivers 200 and the display panel 100. The power supply unit 500 may generate the driving voltages and supply the driving voltages to the driving voltage lines VDL and may generate a common voltage and supply the common voltage to a common electrode shared by the light-emitting elements ED of the pixels PX.

The gate driver 610 may be disposed on one outer side of the display area DA or on one outer side of the non-display area NDA, and the emission control driver 620 may be disposed on the opposite outer side of the display area DA or on the opposite outer side of the non-display area NDA. It should be understood, however, that the present disclosure is not limited thereto. For another example, the gate driver 610 and the emission control driver 620 may both be on one side of the non-display area NDA.

The gate driver 610 may include a plurality of thin-film transistors for generating gate signals based on the gate control signal GCS. For example, the transistors of the gate driver 610 and the transistors of the emission control driver 620 may be formed on the same layer as the transistors of the pixels PX. The gate driver 610 may provide gate signals to the gate lines GL, and the emission control driver 620 may provide emission signals EM to the emission lines EML.

Figure 5:
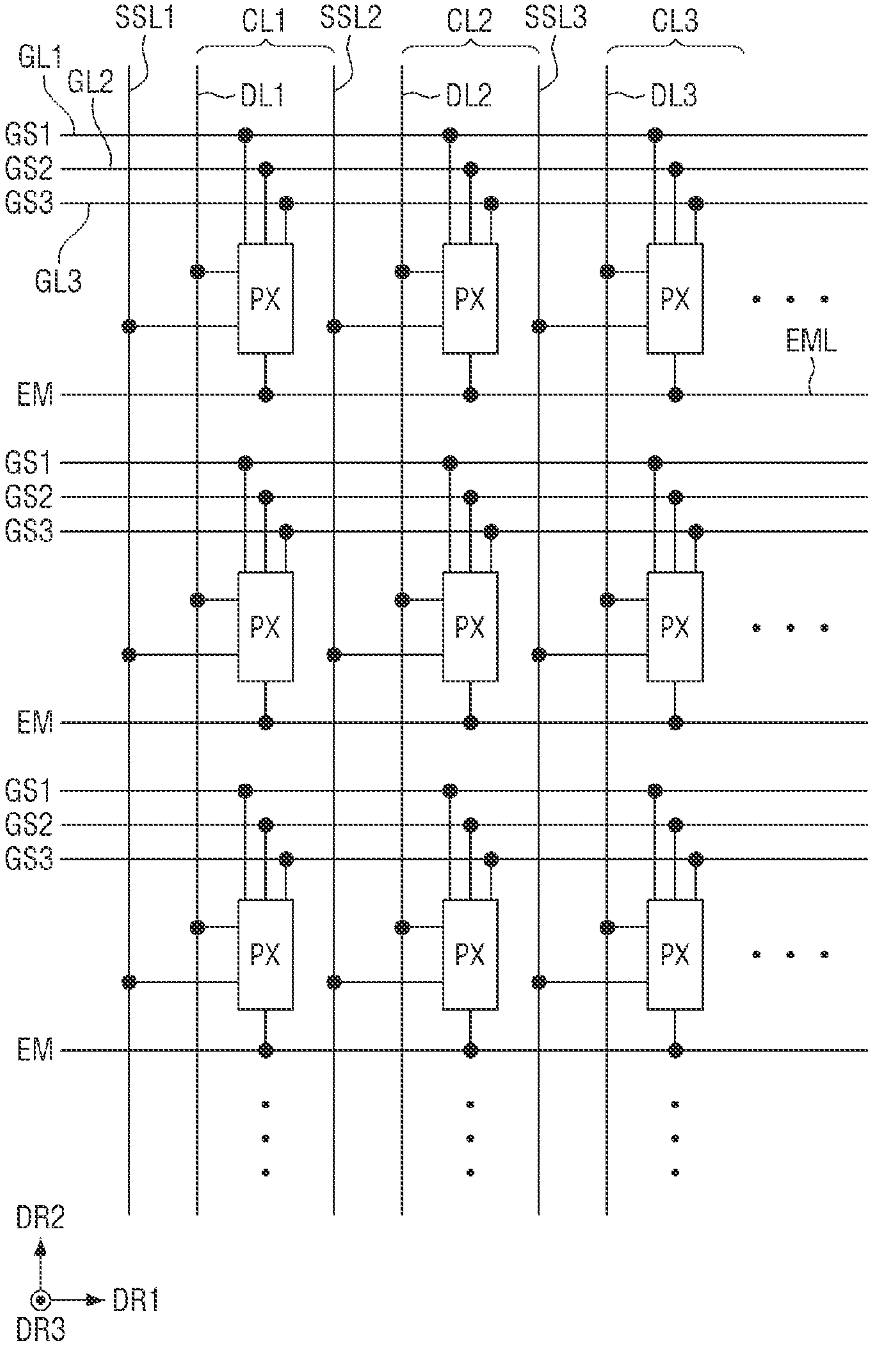
FIG. 5 is a plan view of a display device according to an embodiment of the present disclosure.

FIG. 5 is a plan view of a portion of a display device according to an embodiment of the present disclosure.

Referring to FIG. 5, for example, the pixels PX in a first column CL1 may be connected commonly to a first sensing line SSL1, the pixels PX in a second column CL2 may be connected commonly to a second sensing line SSL2, and the pixels PX in a third column CL3 may be connected commonly to a third sensing line SSL3.

The pixels PX in the first column CL1 may provide lights of a first color, the pixels PX in the second column CL2 may provide lights of a second color, and the pixels PX in the third column CL3 may provide lights of a third color. Herein, the first color may be one of red, blue, and green. The second color may be one of red, blue, and green and may be different from the first color. The third color may be one of red, blue, and green and may be different from the first and second colors.

The first sensing line SSL, the second sensing line SSL and the third sensing line SSL may not be connected with one another.

The pixels PX in the first column CL1 may also be connected commonly to a first data line DL1, the pixels PX in the second column CL2 may be connected commonly to a second data line DL2, and the pixels PX in the third column CL3 may be connected commonly to a third data line DL3.

The pixels PX in the same row, e.g., arranged along the first direction DR1, may be connected commonly to the first gate line GL1, the second gate line GL2, the third gate line GL3, and the emission line EML for that row.

Figure 6:
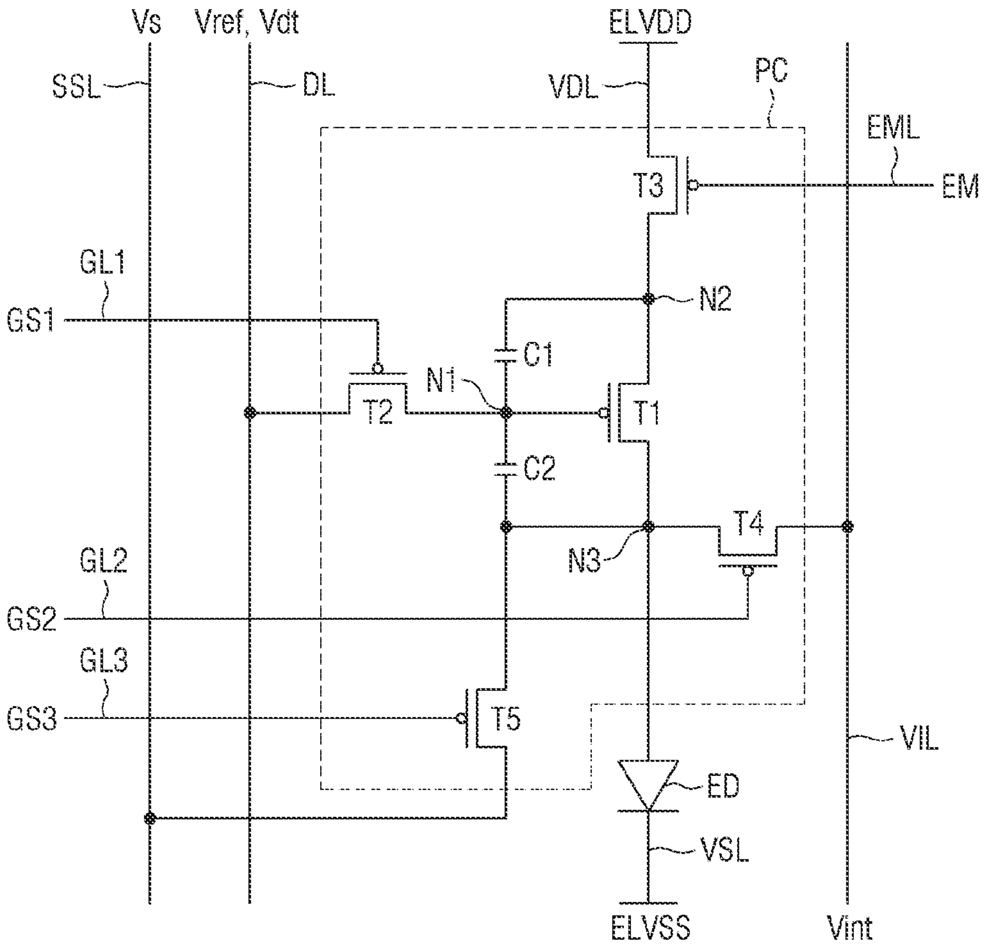
FIG. 6 is a circuit diagram of a pixel of a display device according to an embodiment of the present disclosure.

FIG. 6 is a circuit diagram of a pixel of a display device according to an embodiment of the present disclosure.

As shown in FIG. 6, a pixel PX may be connected to a first gate line GL1, a second gate line GL2, a third gate line GL3, a sensing line SSL, an initialization line VIL, an emission line EML, a data line DL, a driving voltage line VDL, and a common voltage line VSL. The common voltage line VSL may be connected to a common electrode (e.g., a cathode electrode) of a light-emitting element ED.

The pixel PX may include a pixel circuit PC and the light-emitting element ED. The pixel circuit PC may include a first transistor T1, a second transistor T2, a third transistor T3, a fourth transistor T4, a fifth transistor T5, a first capacitor C1, and a second capacitor C2.

The first transistor T1 (e.g., a driving transistor) may include a gate electrode, a source electrode, and a drain electrode. The first transistor T1 may control a source-drain current (hereinafter referred to as a driving current) according to a data voltage applied to the gate electrode. The driving current (e.g., Isd) flowing through the channel region of the first transistor T1 may be proportional to the square of the difference between the threshold voltage Vth of the first transistor T1 and the voltage Vsg between the source electrode and the gate electrode of the first transistor T1, e.g., ($Isd=k\times(Vsg-Vth)^2$), where k denotes a proportionality coefficient determined by the structure and physical properties of the first transistor T1, Vsg denotes the source-gate voltage of the first transistor T1, and Vth denotes the threshold voltage of the first transistor T1. The gate electrode of the first transistor ST1 may be connected to a first node N1, the source electrode of the first transistor T1 may be connected to a second node N2, and the drain electrode of the first transistor T1 may be connected to a third node N3.

The light-emitting element ED may receive the driving current to emit light. The amount or the luminance of the light emitted from the light-emitting element ED may be proportional to or otherwise depend on the magnitude of the driving current Isd. The light-emitting element ED may be an organic light-emitting diode including a first electrode, a second electrode, and an organic light-emitting layer disposed between the first electrode and the second electrode. Alternatively, the light-emitting element ED may be an inorganic light-emitting element including a first electrode, a second electrode, and an inorganic semiconductor disposed between the first electrode and the second electrode. Alternatively, the light-emitting element ED may be a quantum-dot light-emitting element including a first electrode, a second electrode, and a quantum-dot emissive layer between the first electrode and the second electrode. As another example, the light-emitting element ED may be a micro light-emitting diode. The first electrode of the light-emitting element ED may be electrically connected to the third node N3. The second electrode of the light-emitting element ED may be connected to the common voltage line VSL. The second electrode of the light-emitting element ED may receive a common voltage (e.g., a low-level voltage) from the common voltage line VSL.

The second transistor T2 may be turned on by a first gate signal GS1 of the first gate line GL1 to electrically connect the data line DL with the first node N1. The gate electrode of the second transistor T2 may be electrically connected to the first gate line GL1, the source electrode of the second transistor T2 may be electrically connected to the data line DL, and the drain electrode of the second transistor T2 may be electrically connected to the first node N1. The data line DL may transmit a data signal Vdt or a reference voltage Vref.

The third transistor T3 may be turned on by the emission signal EM of the emission line EML to electrically connect the driving voltage line VDL to the second node N2. A gate electrode of the third transistor T3 may be electrically connected to the emission line EML, the source electrode of the third transistor T3 may be electrically connected to the driving voltage line VDL, and the drain electrode of the third transistor T3 may be electrically connected to the second node N2.

The fourth transistor T4 may be turned on by a second gate signal GS2 of the second gate line GL2 to electrically connect the third node N3 with the initialization line VIL. A gate electrode of the fourth transistor T4 may be electrically connected to the second gate line GL2, the source electrode of the fourth transistor T4 may be electrically connected to the third node N3, and the drain electrode of the fourth transistor T4 may be electrically connected to the initialization line VIL. There may be a plurality of initialization lines VIL, and the plurality of initialization lines VIL may be connected with one another. For example, the initialization lines VIL may include a plurality of horizontal initialization lines VIL that extend in the first direction DR1 and are arranged along the second direction DR2, and a plurality of vertical initialization lines VIL that extend in the second direction DR2 and are arranged along the first direction DR1, the horizontal initialization lines VIL and the vertical initialization lines VIL may be connected to each other.

The fifth transistor T5 may be turned on by a third gate signal GS3 of the third gate line GL3 to electrically connect the third node N3 with the sensing line SSL. A gate electrode of the fifth transistor T5 may be electrically connected to the third gate line GL3, the source electrode of the fifth transistor T5 may be electrically connected to the third node N3, and the drain electrode of the fifth transistor T5 may be electrically connected to the sensing line SSL.

The first capacitor C1 may be electrically connected between the first node N1 and the second node N2. For example, a first electrode of the first capacitor C1 may be electrically connected to the first node N1, and a second electrode of the first capacitor C1 may be electrically connected to the second node N2.

The second capacitor C2 may be electrically connected between the first node N1 and the third node N3. For example, a first electrode of the second capacitor C2 may be electrically connected to the first node N1, and a second electrode of the second capacitor C2 may be electrically connected to the third node N3.

When the first transistor T1 and the third transistor T3 are turned on, a driving current is supplied to the light-emitting element ED so that the light-emitting element ED can emit light.

At least one of the above-described first to fifth transistors T1 to T5 may be a metal-oxide-semiconductor field effect transistor (MOSFET). For example, each of the first to fifth transistors T1 to T5 may be a p-type MOSFET. As another example, each of the first to fifth transistors T1 to T5 may be an n-type MOSFET. As yet another example, some of the first to fifth transistors T1 to T5 may be p-type MOSFETs, while the other transistors may be n-type MOSFETs.

Figure 7:
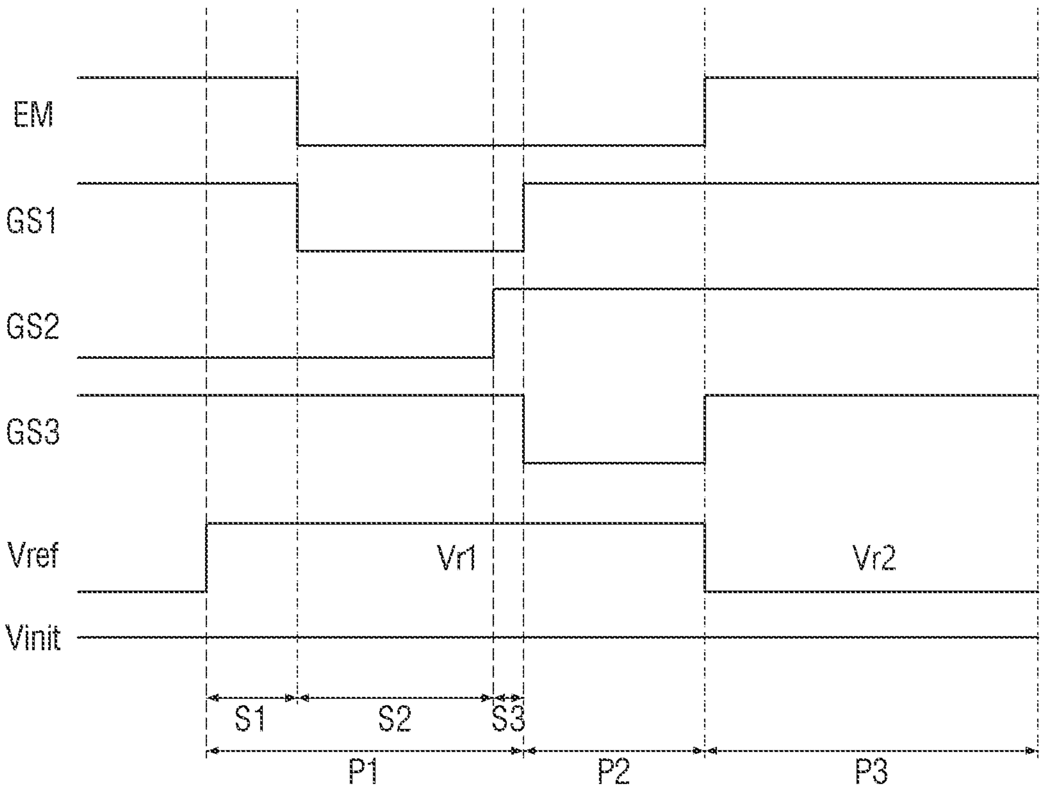
FIG. 7 is a timing diagram illustrating first to third gate signals, an emission signal, a reference voltage, and an initialization voltage Vinit of FIG. 6.

FIG. 7 is a timing diagram illustrating the first to third gate signals GS1 to GS3, the emission signal EM, the reference voltage Vref, and the initialization voltage Vinit of FIG. 6. As in the example shown in FIG. 7, the display device 10 of the present disclosure may operate pixels PX based on an initialization period P1, a sensing period P2, and an off period P3. FIG. 7 may particularly illustrate operation of the display device 10 for detection of defective pixels, e.g., during fabrication or testing of the display device, and the operation illustrated in FIG. 7 may not be used during normal operation of the display device 10, e.g., when the display device 10 displays an image.

The first gate signal GS1, the second gate signal GS2, the third gate signal GS3 and the emission signal EM may each have an active level or a non-active level for each period. The active level of each of the signals GS1, GS2, GS3 and EM may refer to a voltage at the level that can turn on the respective transistors to which the signals are applied. In other words, the signals at the active level may have a value larger than the threshold voltages of the respective transistors. For example, as shown in FIG. 6, when each of the transistors T1 to T5 is a p-type transistor, the active level of each of the signals GS1, GS2, GS3 and EM may refer to a low level. The non-active level of each of the signals GS1, GS2, GS3 and EM may refer to a voltage at the level that can turn off the respective transistors. In other words, the signals at the non-active level may have a value smaller than the threshold voltages of the respective transistors. For example, as shown in FIG. 6, when each of the transistors T1 to T5 is a p-type transistor, the non-active level of each of the signals GS1, GS2, GS3 and EM may refer to a high level. When each of the transistor T1 to T5 is an n-type transistor, the active level of each of the signals GS1, GS2, GS3 and EM may refer to a high level, while the non-active level of each of the signals GS1, GS2, GS3 and EM may refer to a low level.

In the initialization period P1, the emission signal EM, the first gate signal GS1 and the second gate signal GS2 may each have the active level, while the third gate signal GS3 may have the non-active level. For example, during most of the initialization period P1, the emission signal EM, the first gate signal GS1 and the second gate signal GS2 may each have the active level, while the third gate signal GS3 may have the non-active level. At this time, for a certain period of time in the initialization period P1, the emission signal EM, the first gate signal GS1 and the second gate signal GS2 may each have the active level, while the third gate signal GS3 may simultaneously have the non-active level. In other words, in the initialization period P1, the active level of the emission signal EM, the active level of the first gate signal GS1, the active level of the second gate signal GS2 and the non-active level of the third gate signal GS3 may overlap one another for a certain period of time. In the initialization period P1, the reference voltage Vref may have a level of the first voltage Vr1. The reference voltage Vref may be greater than zero and less than a supply voltage ELVDD, for example.

The above-described initialization period P1 may include, for example, a first subsidiary period S1, a second subsidiary period S2, and a third subsidiary period S3.

In the first subsidiary period S1, the emission signal EM, the first gate signal GS1 and the third gate signal GS3 may each have the non-active level, while the second gate signal GS2 may have the active level. In addition, in the first subsidiary period S1, the reference voltage Vref may have the level of the first voltage Vr1.

In the second subsidiary period S2, the emission signal EM, the first gate signal GS1 and the second gate signal GS2 may each have the active level, while the third gate signal GS3 may have the non-active level. In addition, in the second subsidiary period S2, the reference voltage Vref may have the level of the first voltage Vr1. A substantial initialization operation of the initialization period P1 may be performed, for example, during the second subsidiary period S2.

In the third subsidiary period S3, the emission signal EM and the first gate signal GS1 may each have the active level, while the second gate signal GS2 and the third gate signal GS3 may have the non-active level. In addition, in the third subsidiary period S3, the reference voltage Vref may have the level of the first voltage Vr1.

In the sensing period P2, the emission signal EM and the third gate signal GS3 may each have the active level, while the first gate signal GS1 and the second gate signal GS2 may each have the non-active level. In addition, in the sensing period P2, the reference voltage Vref may have the level of the first voltage Vr1.

In the off period P3, the emission signal EM, the first gate signal GS1, the second gate signal GS2 and the third gate signal GS3 may each have the non-active level. In addition, in the off period P3, the reference voltage Vref may have a level of the second voltage Vr2. The second voltage Vr2 of the reference voltage Vref may be lower than the first voltage Vr1 of the reference voltage Vref, for example.

It should be noted that the initialization voltage Vinit may be maintained at a constant level during all of the periods including the initialization period P1, the sensing period P2 and the off period P3. For example, the initialization voltage Vinit may be a DC voltage always having a constant level regardless of the periods. Herein, the initialization voltage Vinit may be, for example, a DC voltage greater than the common voltage ELVSS and less than the supply voltage ELVDD.

The display device of FIG. 6 may include an emissive layer. For example, the light-emitting element ED of the display device of FIG. 6 may include a pixel electrode (e.g., an anode electrode), an emissive layer, and a common electrode (e.g., a cathode electrode).

Figure 8:
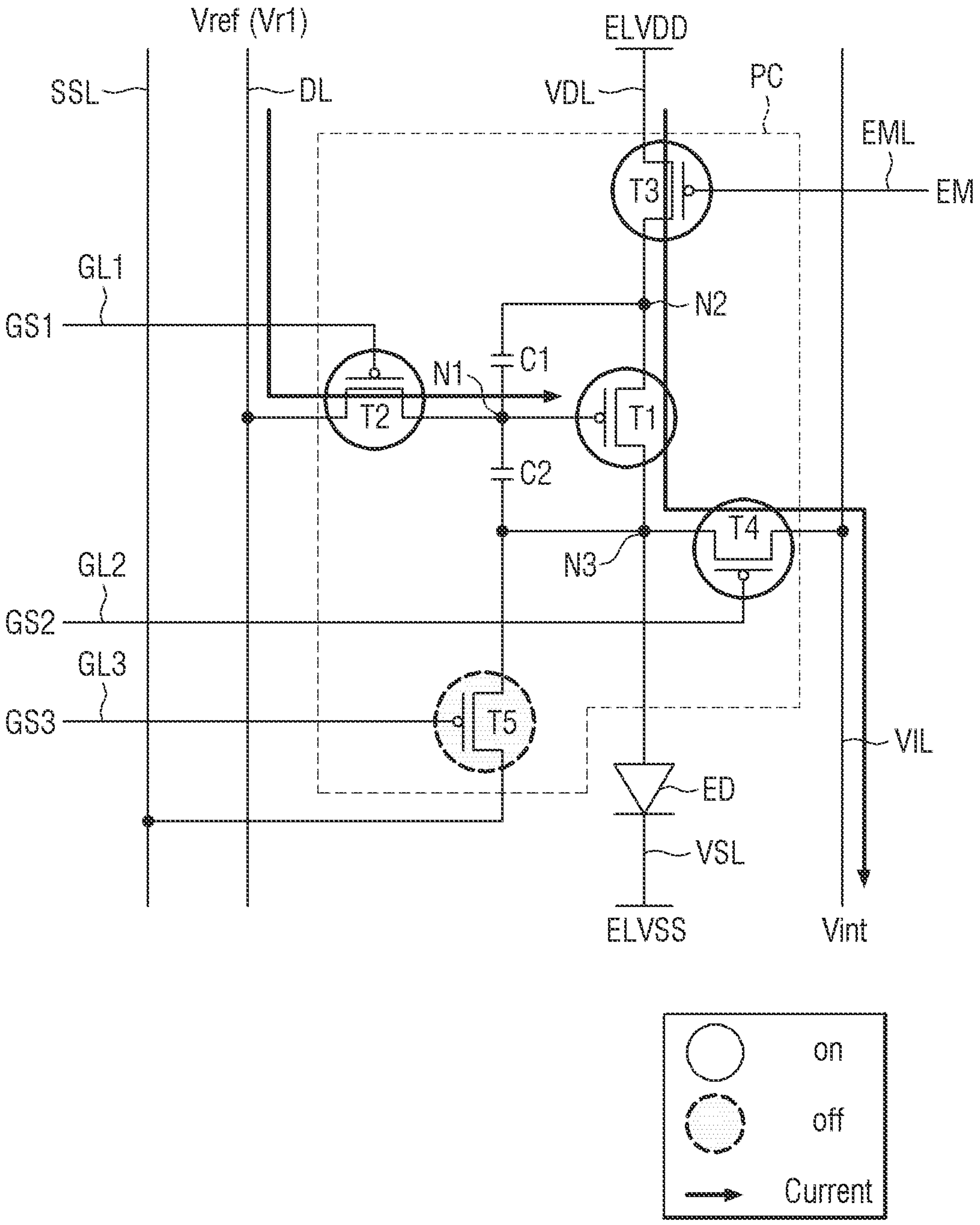
FIG. 8 illustrates operation of the display device of FIG. 6 in the initialization period of FIG. 7.
Figure 9:
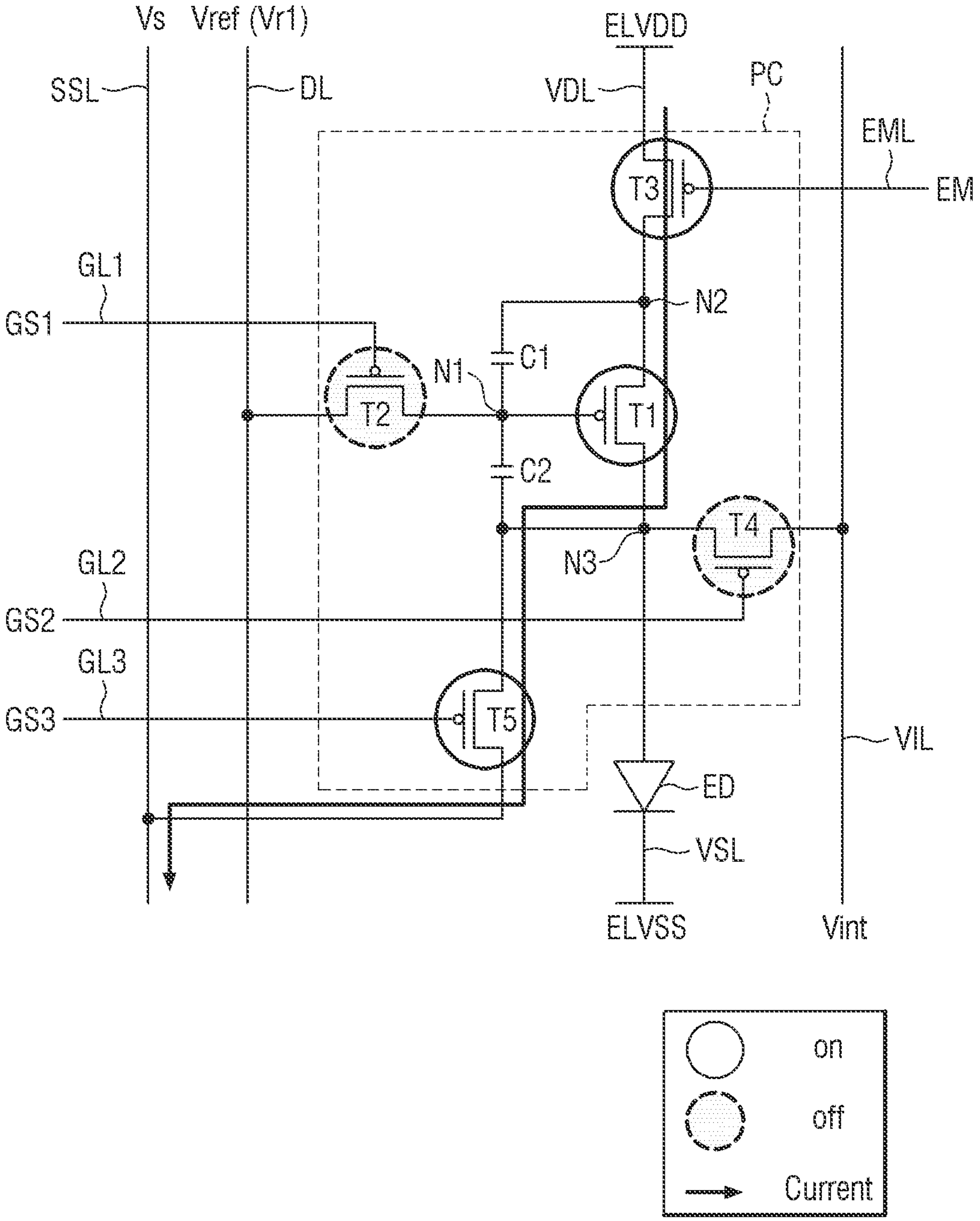
FIG. 9 illustrates operation of the display device of FIG. 6 in the sensing period of FIG. 7.
Figure 10:
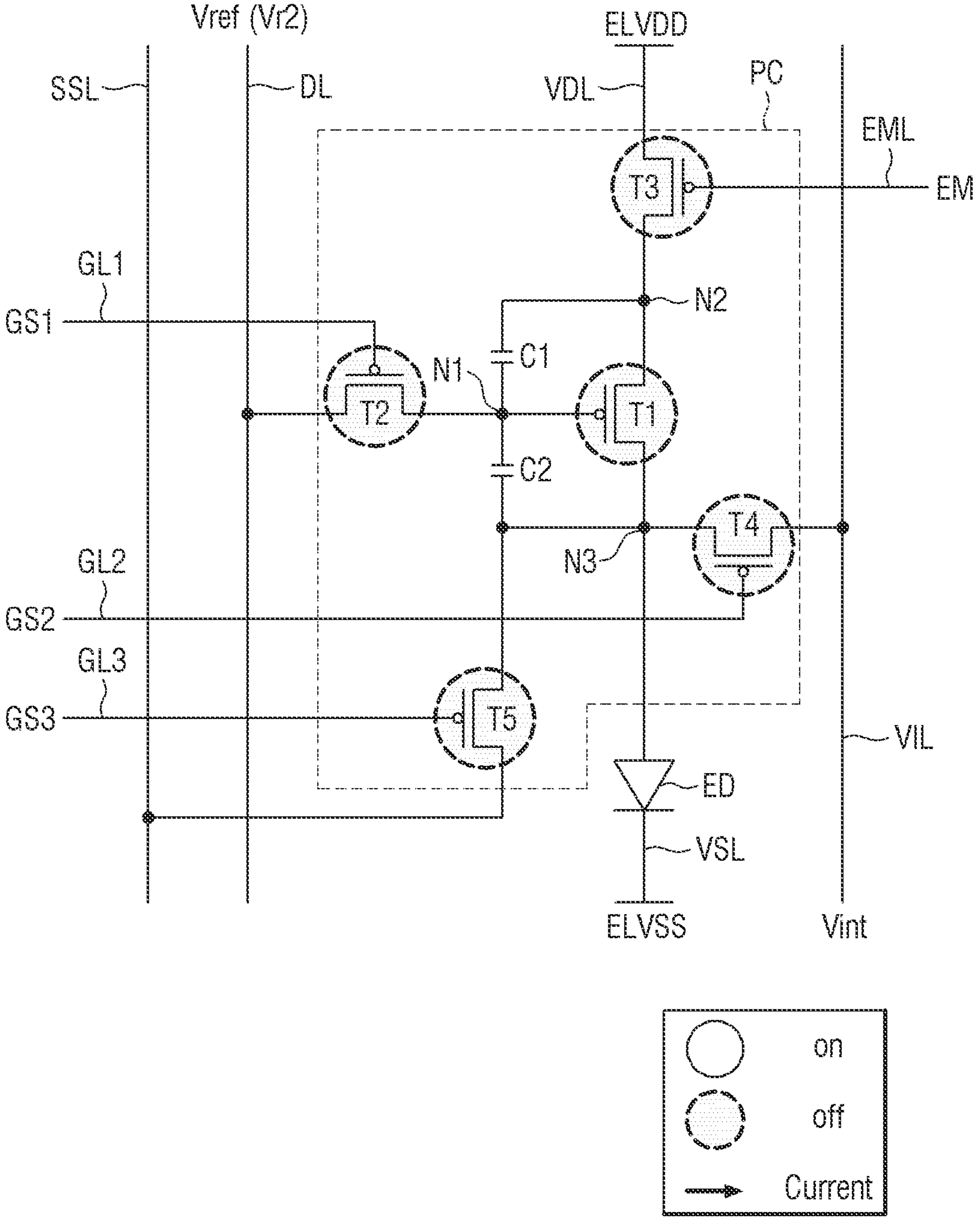
FIG. 10 illustrates operation of the display device of FIG. 6 in the off period of FIG. 7.

Operations of the display device according to an embodiment of the present disclosure will be described with reference to FIGS. 7 to 10. In FIGS. 8 to 10, a transistor surrounded by a circle of a relatively thick line indicates that the transistor is turned on. On the other hand, a transistor surrounded by a dashed circle indicates that the transistor is turned off. In addition, arrows in FIGS. 8 to 10 indicate current flows.

The display device of FIGS. 8 to 10 may be operational or may be defective, e.g., may not include an emissive layer. For example, the light-emitting element ED of the display device of FIGS. 8 to 10 may include an anode electrode and no emissive layer or no common electrode. In other words, the light-emitting element of the display device of FIGS. 8 to 10 receiving the signals according to FIG. 7 may include a pixel electrode but no emissive layer and no common electrode. For example, the light-emitting element ED of the display device of FIGS. 8 to 10 may include only a pixel electrode.

Initially, operation of the display device in the initialization period P1 will be described with reference to FIGS. 7 and 8.

FIG. 8 illustrates an operation of the display device of FIG. 6 in the initialization period P1 of FIG. 7. As shown in FIG. 7, in the second subsidiary period S2 of the initialization period P1, the emission signal EM, the first gate signal GS1 and the second gate signal GS2 may each have the active level, and the third gate signal GS3 may have the non-active level. In addition, in the second subsidiary period S2, the reference voltage Vref may have the level of the first voltage Vr1.

As shown in FIG. 8, the first gate signal GS1 at the active level may be applied to the gate electrode of the second transistor T2 through the first gate line GL1. Accordingly, the second transistor T2 may be turned on.

As shown in FIG. 8, the second gate signal GS2 at the active level may be applied to the gate electrode of the fourth transistor T4 through the second gate line GL2. Accordingly, the fourth transistor T4 may be turned on.

As shown in FIG. 8, the third gate signal GS3 at the non-active level may be applied to the gate electrode of the fifth transistor T5 through the third gate line GL3. Accordingly, the fifth transistor T5 may be turned off.

As shown in FIG. 8, the emission signal EM at the active level may be applied to the gate electrode of the third transistor T3 through the emission line EML. Accordingly, the third transistor T3 may be turned on.

As the second transistor T2, the third transistor T3 and the fourth transistor T4 are turned on during the initialization period P1, the gate electrode of the first transistor T1 (e.g., the first node N1), the source electrode of the first transistor T1 (e.g., the second node N2), and the drain electrode of the first transistor T1 (e.g., the third node N3) may be initialized. For example, the reference voltage Vref from the data line DL may be applied through the turned-on second transistor T2 to the first node N1, which is the gate electrode of the first transistor T1. In addition, the supply voltage ELVDD from the driving voltage line VDL may be applied to the second node N2 that is the source electrode of the first transistor T1 through the turned-on third transistor T3. In addition, the initialization voltage Vinit from the initialization line VIL may be applied to the third node N3 that is the drain electrode of the first transistor T1 through the turned-on fourth transistor T4. Accordingly, the voltage of each of the gate electrode of the first transistor T1, the source electrode of the first transistor T1, and the drain electrode of the first transistor T1 may be initialized. For example, the gate electrode of the first transistor T1 may be initialized to the reference voltage Vref, the source electrode of the first transistor T1 may be initialized to the supply voltage ELVDD, and the drain electrode of the first transistor T1 (or the anode electrode of the light-emitting element ED) may be initialized to the initialization voltage Vinit.

In addition, the first transistor T1 is a p-type transistor, and the reference voltage Vref applied to the first node N1, which is the gate electrode of the first transistor T1, is less than the supply voltage ELVDD applied to the source electrode of the first transistor T1. Accordingly, during the initialization period P1, the voltage difference between the gate electrode and the source electrode of the first transistor T1 (hereinafter referred to as gate-source voltage) may be a voltage of negative polarity. Accordingly, in the initialization period P1, the first transistor T1 may be turned on by the gate-source voltage of negative polarity. Therefore, a current path may be generated between the driving voltage line VDL and the initialization line VIL through the turned-on first transistor T1. The voltages of the source and drain electrodes of the first transistor T1 may be initialized also by the current flowing along the current path.

Operation of the display device in the sensing period P2 will be described with reference to FIGS. 7 and 9. FIG. 9 illustrates an operation of the display device of FIG. 6 in the sensing period P2 of FIG. 7. In an embodiment, the sensing period P2 may be for an inspection process and may be the only time that the fifth transistor is turned on, and the fifth transistor may always remain off during normal display operation.

As shown in FIG. 7, in the sensing period P2, the emission signal EM and the third gate signal GS3 may each have the active level, while the first gate signal GS1 and the second gate signal GS2 may each have the non-active level. In addition, in the sensing period P2, the reference voltage Vref may have the level of the first voltage Vr1.

As shown in FIG. 9, the first gate signal GS1 at the non-active level may be applied to the gate electrode of the second transistor T2 through the first gate line GL1. Accordingly, the second transistor T2 may be turned off.

As shown in FIG. 9, the second gate signal GS2 at the non-active level may be applied to the gate electrode of the fourth transistor T4 through the second gate line GL2. Accordingly, the fourth transistor T4 may be turned off.

As shown in FIG. 9, the third gate signal GS3 at the non-active level may be applied to the gate electrode of the fifth transistor T5 through the third gate line GL3. Accordingly, the fifth transistor T5 may be turned on.

As shown in FIG. 9, the emission signal EM at the active level may be applied to the gate electrode of the third transistor T3 through the emission line EML. Accordingly, the third transistor T3 may be turned on.

As the second transistor T2 is turned off, the first node N1, which is the gate electrode of the first transistor T1, may be electrically floating, and the first voltage Vr1 of the reference voltage Vref applied during a previous period (e.g., the initialization period P1) may be maintained at the floating first node N1. At this time, the first voltage Vr1 of the first node N1 may be maintained by a first capacitor C1. By the first voltage Vr1 maintained by the first capacitor C1, the first transistor T1 may remain turned on.

The second capacitor C2 may compensate for the magnitude of the driving current according to the deviations in the threshold voltage of the first transistor T1 (e.g., the threshold voltage by a body electrode of the first transistor T1) for each of the pixels PX. For example, due to variations during the fabrication processes, the threshold voltage of the first transistor T1 of each pixel may have deviations within or out of the allowable range. Therefore, the second capacitor C2 may adjust the voltage of the gate electrode of the first transistor T1 (hereinafter referred to as gate voltage) according to the level of the threshold voltage of the first transistor T1. In this manner, it is possible to compensate for the deviations of the driving current according to deviations of the threshold voltage of the first transistor T1 of each pixel PX. For example, if the threshold voltage of the first transistor T1 is less than the predetermined reference threshold voltage, the first transistor T1 may flow more driving current than a normal value. Then, the voltage of the drain electrode (hereinafter referred to as drain voltage) of the first transistor T1 increases due to the driving current being more than the normal value, and the voltage on the opposite side of the second capacitor C2 (for example, the voltage of the gate electrode of the first transistor T1) may also increase as much as the increased drain voltage. As the gate voltage of the first transistor T1 increases, the gate-source voltage of the first transistor T1 may increase in the positive direction. In other words, the gate-source voltage of the p-type first transistor T1 is shifted so that the gate-source voltage becomes less than the threshold voltage. As a result, if the driving current flowing through the first transistor T1 is greater than the normal value, the second capacitor C2 reduces the gate-source voltage of the first transistor T1, and thus the driving current of the first transistor T1 may decrease to the normal value. On the other hand, if the threshold voltage of the first transistor T1 is greater than the predetermined reference threshold voltage, the first transistor T1 may flow less driving current than the normal value. Then, the drain voltage of the first transistor T1 decreases due to the driving current being less than the normal value, and the voltage on the opposite side of the second capacitor C2 (for example, the voltage of the gate electrode of the first transistor T1) may also decrease as much as the decreased drain voltage. As the gate voltage of the first transistor T1 decreases, the gate-source voltage of the first transistor T1 may increase in the negative direction. In other words, the gate-source voltage of the p-type first transistor T1 is shifted so that it becomes greater than the threshold voltage. As a result, if the driving current flowing through the first transistor T1 is smaller than the normal value, the second capacitor C2 increases the gate-source voltage of the first transistor T1, and thus the driving current of the first transistor T1 may increase to the normal value. Accordingly, the deviations of the driving current according to the deviations of the threshold voltage of each of the pixels PX can be reduced. Incidentally, the above-described first capacitor C1 may store a gate voltage (e.g., the voltage of the first node N1) compensated for by the second capacitor C2.

As described above, as the third transistor T3, the first transistor T1 and the fifth transistor T5 are turned on, a current path may be formed between the driving voltage line VDL and the sensing line SSL through the third transistor T3, the first transistor T1 and the fifth transistor T5. Therefore, a current (e.g., sensing current) flowing along the driving voltage line VDL, the third transistor T3, the first transistor T1, the fifth transistor T5 and the sensing line SSL may be formed. This sensing current may be provided to the detector 230 through the sensing line SSL. The detector 230 may receive the sensing current flowing through the third transistor T3, the first transistor T1 and the fifth transistor T5 via the sensing line SSL and may determine whether the pixel PX is defective based on the received sensing current. For example, the detector 230 may convert sensing currents supplied through the sensing lines SSL into voltages (e.g., sensing voltages Vs), may compare the sensing voltages Vs with a predetermined criterion voltage, and may determine whether pixels are defective based on the comparison results. For example, the detector 230 may determine that the pixel PX is not defective if it is determined that the sensing voltage Vs falls within the predetermined normal range of the criterion voltage based on the comparison results. As a specific example, the criterion voltage may have the lower limit voltage and the upper limit voltage, and accordingly the detector 230 may determine that the pixel PX is normal if it is determined that the sensing voltage Vs is equal to or greater than the lower limit voltage of the criterion voltage and equal to or less than the upper limit voltage of the criterion voltage. On the other hand, the detector 230 may determine that the pixel PX is defective if it is determined that the sensing voltage Vs falls out of the predetermined normal range of the criterion voltage based on the comparison results. As a specific example, the detector 230 may determine that the pixel PX is defective if it is determined that the sensing voltage Vs is less than the lower limit voltage or greater than the upper limit voltage of the criterion voltage. In other words, the detector 230 may determine the pixel PX as a bad pixel.

Operation of the display device in the off period P3 will be described with reference to FIGS. 7 and 10.

FIG. 10 illustrates an operation of the display device of FIG. 6 in the off period P3 of FIG. 7.

As shown in FIG. 7, in the off period P3, the emission signal EM, the first gate signal GS1, the second gate signal GS2 and the third gate signal GS3 may each have the non-active level. In addition, in the off period P3, the reference voltage Vref may have a level of the second voltage Vr2. The second voltage Vr2 of the reference voltage Vref may be smaller than the first voltage Vr1 of the reference voltage Vref, for example.

As shown in FIG. 10, the first gate signal GS1 at the non-active level may be applied to the gate electrode of the second transistor T2 through the first gate line GL1. Accordingly, the second transistor T2 may be turned off.

As shown in FIG. 10, the second gate signal GS2 at the non-active level may be applied to the gate electrode of the fourth transistor T4 through the second gate line GL2. Accordingly, the fourth transistor T4 may be turned off.

As shown in FIG. 10, the third gate signal GS3 at the non-active level may be applied to the gate electrode of the fifth transistor T5 through the third gate line GL3. Accordingly, the fifth transistor T5 may be turned off.

As shown in FIG. 10, the emission signal EM at the non-active level may be applied to the gate electrode of the third transistor T3 through the emission line EML. Accordingly, the third transistor T3 may be turned off.

As shown in FIG. 10, the first transistor T1 may be turned off.

Pixels in one column commonly connected to one sensing line may be sequentially connected to the sensing line. For example, as shown in FIG. 5, a plurality of pixels PX in the first column CL1 may be sequentially connected to a first sensing line SSL1. Specifically, let us define three pixels PX in the first column as a first pixel, a second pixel and a third pixel in the reverse order in the second direction DR2 from the top side. The third gate signal GS3 may be first applied to the third transistor T3 of the first pixel, then the third gate signal GS3 may be applied to the third transistor T3 of the second pixel, and then the third gate signal GS3 may be applied to the third transistor T3 of the third pixel in this order. Accordingly, the sensing voltages Vs of the pixels PX of the first column CL1 may be sequentially applied to the first sensing line SSL1.

Figure 11:
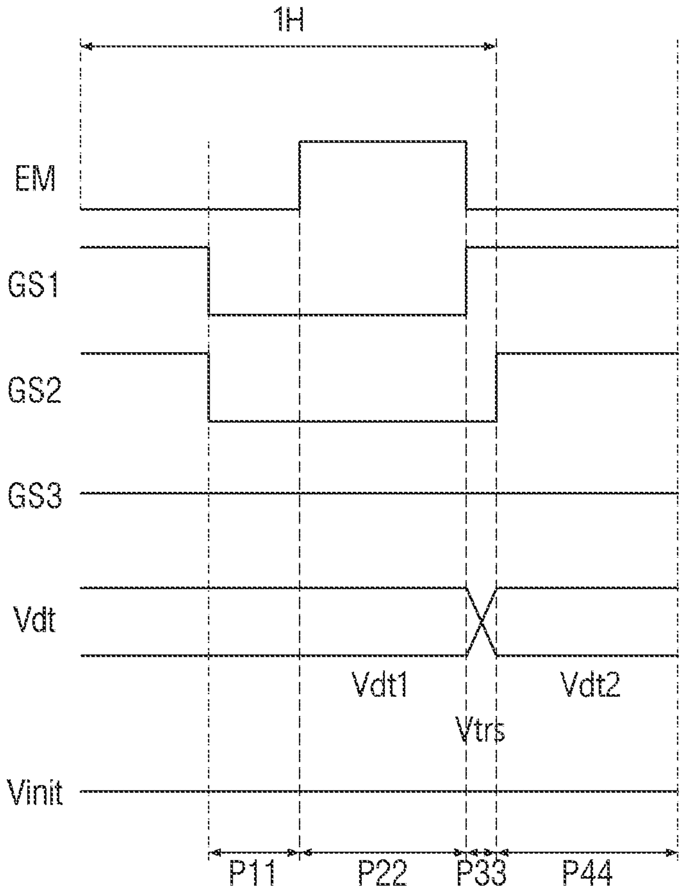
FIG. 11 is a timing diagram illustrating first to third gate signals, an emission signal, a reference voltage, and an initialization voltage Vinit of FIG. 6.

FIG. 11 is a timing diagram illustrating the first to third gate signals GS1 to GS3, the emission signal EM, the reference voltage Vref, and the initialization voltage Vinit of FIG. 6. FIG. 11 illustrates an operation of the display device after the off period P3 of FIG. 7, for example. The display device of FIG. 11 may be, for example, a display device including an emissive layer. For example, a light-emitting element ED of the display device receiving the signals of FIG. 11 may include a pixel electrode (e.g., an anode electrode), an emissive layer, and a common electrode (e.g., a cathode electrode). The operation illustrated in FIG. 11 may particularly be employed during normal operation of the display device, e.g., to display an image.

The display device 10 of the present disclosure as described above may be fabricated such that the display device includes an emissive layer on a pixel electrode, a common electrode on the emissive layer, an encapsulation layer ENC on the common electrode, and a color filter layer CFL on the encapsulation layer ENC, and performing the above-described inspection process may determine whether pixels are defective. Subsequently, the display device including the emissive layer, the common electrode, etc. may operate based on an initialization/write period P11, a compensation period P22, a bypass period P33, and an emission period P44 as in the example shown in FIG. 11. For example, after the off period, the display device 10 of the present disclosure may operate based on the initialization/write period P11, the compensation period P22, the bypass period P33, and the emission period P44 of FIG. 11. It should be noted that the fifth transistor T5 may always remain turned off regardless of the period P11, P22, P33, or P44. As an example, the third gate signal GS3 of the third gate line GL3 connected to the gate electrode of the fifth transistor T5 may remain at the non-active level throughout the periods shown in FIG. 11. In other words, the third gate signal GS3 may be a DC signal having a magnitude that can turn off the fifth transistor T5. In addition, a sensing line SSL of the display device including the emissive layer, the common electrode, etc. may be connected to the detector 230 or the power supply unit 500 and may receive a DC voltage from the detector 230 or the power supply unit 500.

The initialization/write period P11, the compensation period P22, the bypass period P33 and the emission period P44 may correspond to one horizontal period 1H. In other words, one horizontal period 1H may include an initialization/write period P11, a compensation period P22, a bypass period P33, and an emission period P44. The horizontal period 1H may refer to a period during which pixels (e.g., pixels in a row) arranged in a horizontal direction (e.g., the first direction DR1 in FIG. 5) are operated. The pixels in one row may refer to a plurality of pixels connected to the same gate line (e.g., the first gate line GL1) in common and also to different data lines DL. In addition, the pixels in one row may be connected to a plurality of sensing lines SSL.

The first gate signal GS1, the second gate signal GS2, the third gate signal GS3 and the emission signal EM may each have an active level or a non-active level for each period. The active level of each of the signals GS1, GS2, GS3 and EM may refer to a voltage at the level that can turn on the respective transistors to which the signals are applied. In other words, the signals at the active level may have a value larger than the threshold voltages of the respective transistors. For the example shown in FIG. 11, each of the transistors T1 to T5 is a p-type transistor as shown in FIG. 6, and the active level of each of the signals GS1, GS2, GS3 and EM may refer to a low level. The non-active level of each of the signals GS1, GS2, GS3 and EM may refer to a voltage at the level that can turn off the respective transistors. In other words, the signals at the non-active level may have a value smaller than the threshold voltages of the respective transistors. For the example shown in FIG. 11, each of the transistors T1 to T5 is a p-type transistor as shown in FIG. 6, and the non-active level of each of the signals GS1, GS2, GS3 and EM may refer to a high level. If each of the transistor T1 to T5 were an n-type transistor, the active level of each of the signals GS1, GS2, GS3 and EM may refer to a high level, while the non-active level of each of the signals GS1, GS2, GS3 and EM may refer to a low level.

In the initialization/write period P11, the emission signal EM, the first gate signal GS1, and the second gate signal GS2 may each have the active level, while the third gate signal GS3 may have the non-active level. In addition, during the initialization/write period P11, data voltage Vdt may be applied to the data line DL. The data voltage Vdt may be a voltage representing a particular gray level (or luminance) for displaying images. In the initialization/write period P11, the data voltage Vdt may be the data voltage Vdt1 of the previous horizontal period (hereinafter referred to as the previous data voltage).

In the compensation period P22, the first gate signal GS1 and the second gate signal GS2 may each have the active level, while the emission signal EM and the third gate signal GS3 may each have the non-active level. In addition, in the compensation period P22, the previous data voltage Vdt1 may be applied to the data line DL.

In the bypass period P33, the emission signal EM and the second gate signal GS2 may each have the active level, while the first gate signal GS and the third gate signal GS3 may each have the non-active level. In addition, in the bypass period P33, the data voltage Vdt of the data line DL may be a transient data voltage Vtrs that changes (or transitions) from the previous data voltage Vdt1 to the current data voltage Vdt2.

In the emission period P44, the emission signal EM may have the active level, while the first gate signal GS1, the second gate signal GS2 and the third gate signal GS3 may each have the non-active level. In addition, in the emission period P44, the data voltage Vdt may be applied to the data line DL. The data voltage Vdt may be a voltage representing a particular gray level (or luminance) for displaying images. In the emission period P44, the data voltage Vdt may be the data voltage Vdt2 of the current horizontal period (hereinafter referred to as the current data voltage).

The initialization voltage Vinit may be maintained at a constant level during all of the periods including the initialization/write period P11, the compensation period P22, the bypass period P33, and the emission period P44. For example, the initialization voltage Vinit may be a DC voltage always having a constant level regardless of the period P11, P22, P33, or P44. Herein, the initialization voltage Vinit may be, for example, a DC voltage greater than the common voltage ELVSS and less than the supply voltage ELVDD.

Operations of the display device according to an embodiment of the present disclosure will be described with reference to FIGS. 11 to 15. In FIGS. 12 to 15, a transistor surrounded by a circle of a relatively thick line indicates that the transistor is turned on. On the other hand, a transistor surrounded by a dashed circle indicates that the transistor is turned off. In addition, arrows in FIGS. 12 to 15 indicate current flows.

Figure 12:
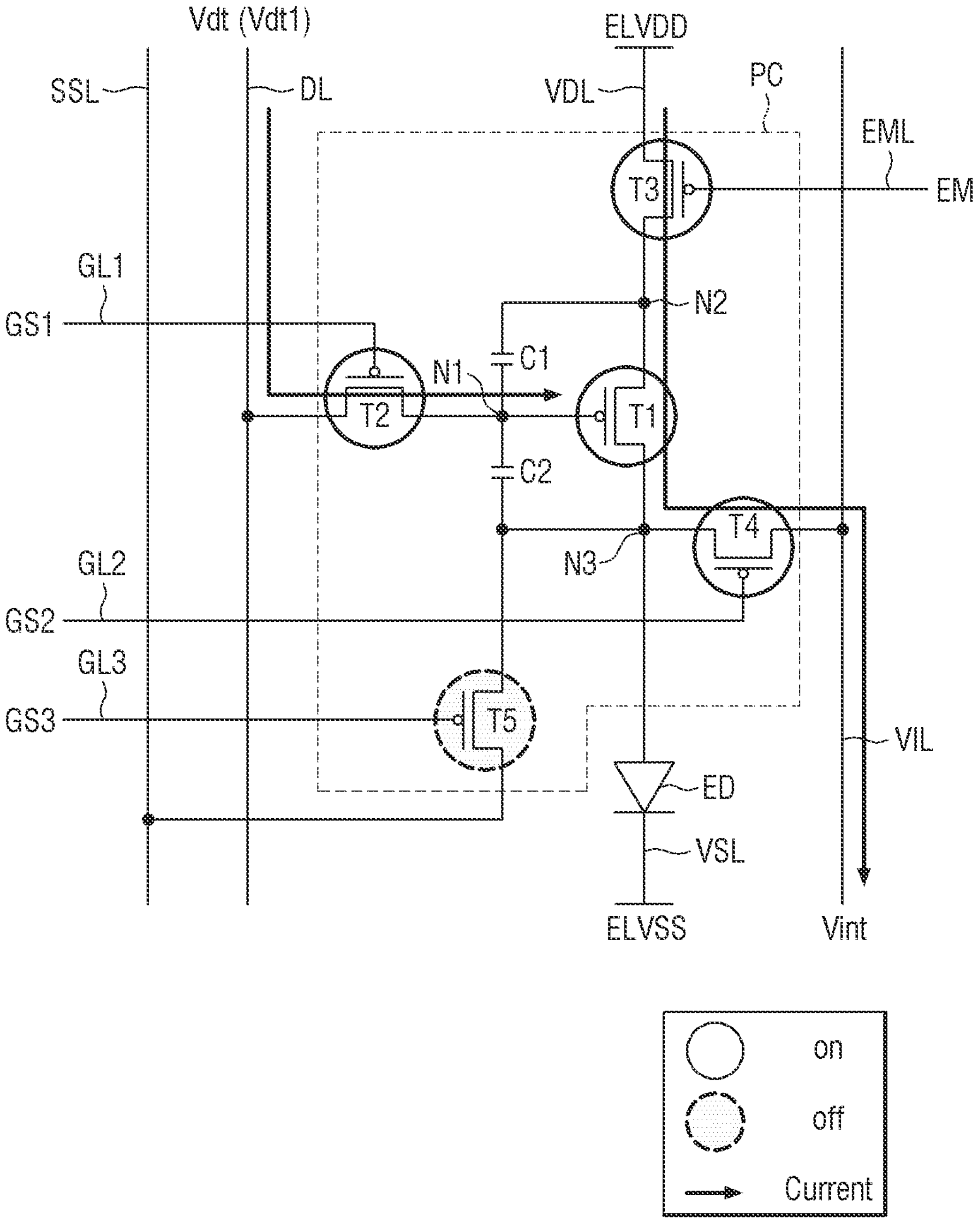
FIG. 12 illustrates operation of the display device of FIG. 6 in the initialization/write period of FIG. 11.

Initially, operation of the display device in the initialization/write period P11 will be described with reference to FIGS. 11 and 12. FIG. 12 illustrates an operation of the display device of FIG. 6 in the initialization/write period P11 of FIG. 11. As shown in FIG. 11, in the initialization/write period P11, the emission signal EM, the first gate signal GS1 and the second gate signal GS2 may each have the active level, while the third gate signal GS3 may have the non-active level. In addition, during the initialization/write period P11, previous data voltage Vdt1 may be applied to the data line DL.

As shown in FIG. 12, the first gate signal GS1 at the active level may be applied to the gate electrode of the second transistor T2 through the first gate line GL1. Accordingly, the second transistor T2 may be turned on.

As shown in FIG. 12, the second gate signal GS2 at the active level may be applied to the gate electrode of the fourth transistor T4 through the second gate line GL2. Accordingly, the fourth transistor T4 may be turned on.

As shown in FIG. 12, the emission signal EM at the active level may be applied to the gate electrode of the third transistor T3 through the emission line EML. Accordingly, the third transistor T3 may be turned on.

As shown in FIG. 12, the third gate signal GS3 at the non-active level may be applied to the gate electrode of the fifth transistor T5 through the third gate line GL3. Accordingly, the fifth transistor T5 may be turned off.

As shown in FIG. 12, the first transistor T1 may be turned on by the previous data voltage Vdt1.

As the second transistor T2, the third transistor T3 and the fourth transistor T4 are turned on during the initialization/weight period P11, the gate electrode of the first transistor T1 (e.g., the first node N1), the source electrode of the first transistor T1 (e.g., the second node N2), and the drain electrode of the first transistor T1 (e.g., the third node N3) may be initialized. For example, the previous data voltage Vdt1 from the data line DL may be applied through the turned-on second transistor T2 to the first node N1, which is the gate electrode of the first transistor T1. In addition, the supply voltage ELVDD from the driving voltage line VDL may be applied to the second node N2 that is the source electrode of the first transistor T1 through the turned-on third transistor T3. In addition, the initialization voltage Vinit from the initialization line VIL may be applied to the third node N3 that is the drain electrode of the first transistor T1 through the turned-on fourth transistor T4. Accordingly, the voltage of each of the gate electrode of the first transistor T1, the source electrode of the first transistor T1, and the drain electrode of the first transistor T1 may be initialized. For example, the gate electrode of the first transistor T1 may be initialized to the previous data voltage Vdt1, the source electrode of the first transistor T1 may be initialized to the supply voltage ELVDD, and the drain electrode of the first transistor T1 (or the anode electrode of the light-emitting element ED) may be initialized to the initialization voltage Vinit.

In addition, a current path may be generated between the driving voltage line VDL and the initialization line VIL through the turned-on first transistor T1. The voltages of the source and drain electrodes of the first transistor T1 may also be initialized by the current flowing along the current path.

Figure 13:
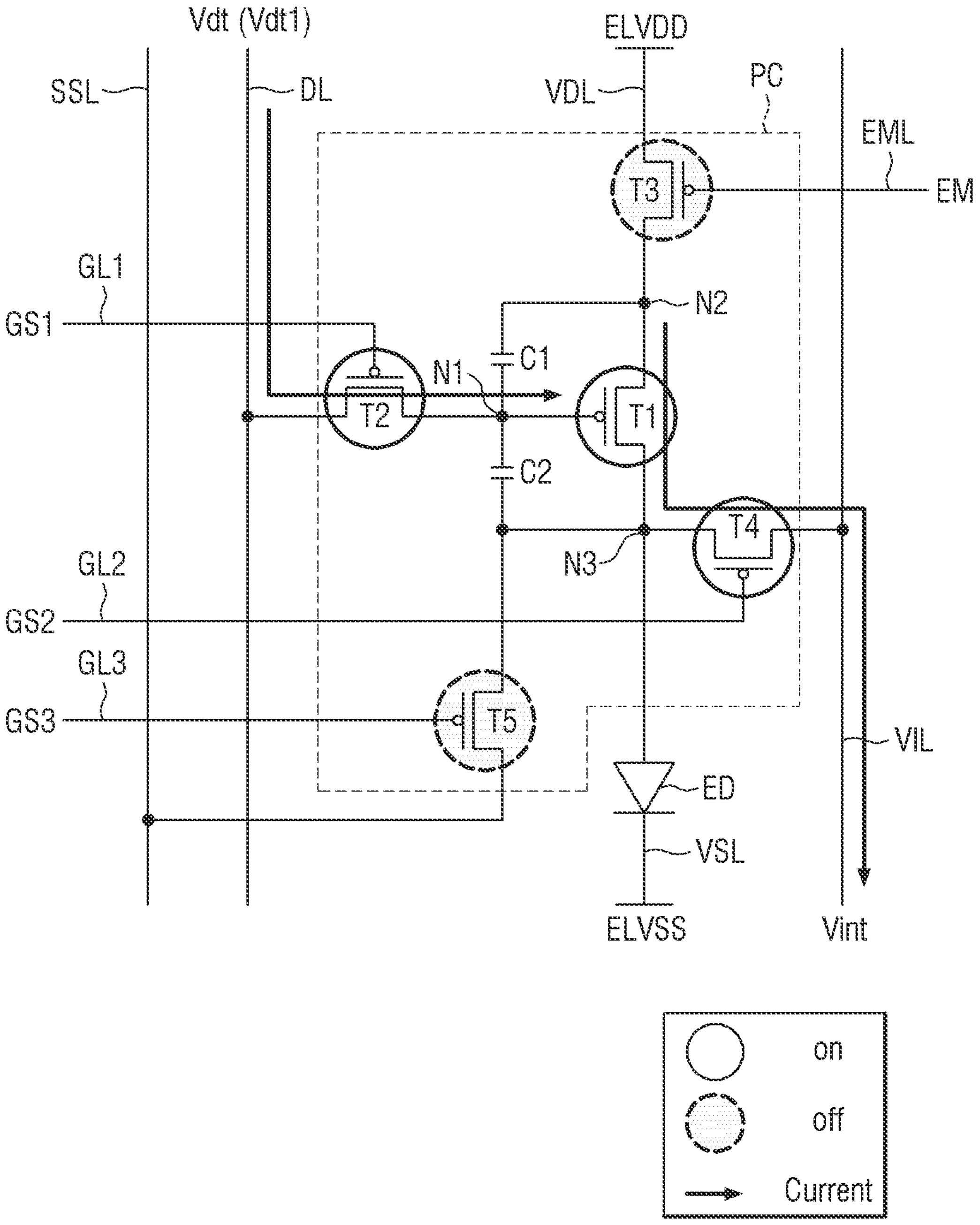
FIG. 13 illustrates operation of the display device of FIG. 6 in the compensation period of FIG. 11.

Operation of the display device in the compensation period P22 will be described with reference to FIGS. 11 and 13. FIG. 13 illustrates an operation of the display device in the compensation period P22 of FIG. 11. As shown in FIG. 11, the first gate signal GS1 and the second gate signal GS2 may each have the active level, while the emission signal EM and the third gate signal GS3 may each have the non-active level. In addition, in the compensation period P22, the previous data voltage Vdt1 may be applied to the data line DL.

As shown in FIG. 13, the first gate signal GS1 at the active level may be applied to the gate electrode of the second transistor T2 through the first gate line GL1. Accordingly, the second transistor T2 may be turned on.

As shown in FIG. 13, the second gate signal GS2 at the active level may be applied to the gate electrode of the fourth transistor T4 through the second gate line GL2. Accordingly, the fourth transistor T4 may be turned on.

As shown in FIG. 13, the emission signal EM at the non-active level may be applied to the gate electrode of the third transistor T3 through the emission line EML. Accordingly, the third transistor T3 may be turned off.

As shown in FIG. 13, the third gate signal GS3 at the non-active level may be applied to the gate electrode of the fifth transistor T5 through the third gate line GL3. Accordingly, the fifth transistor T5 may be turned off.

As shown in FIG. 13, the first transistor T1 may be turned on by the previous data voltage Vdt1.

In the compensation period P22, the threshold voltage of the first transistor T1 may be stored in the first capacitor C1. For example, the threshold voltage of the first transistor T1 may be stored in the first capacitor C1 in a source-follower mode. At this time, the voltage of the second node N2 may be, for example, obtained by subtracting the threshold voltage of the first transistor T1 from the previous data voltage Vdt1.

Figure 14:
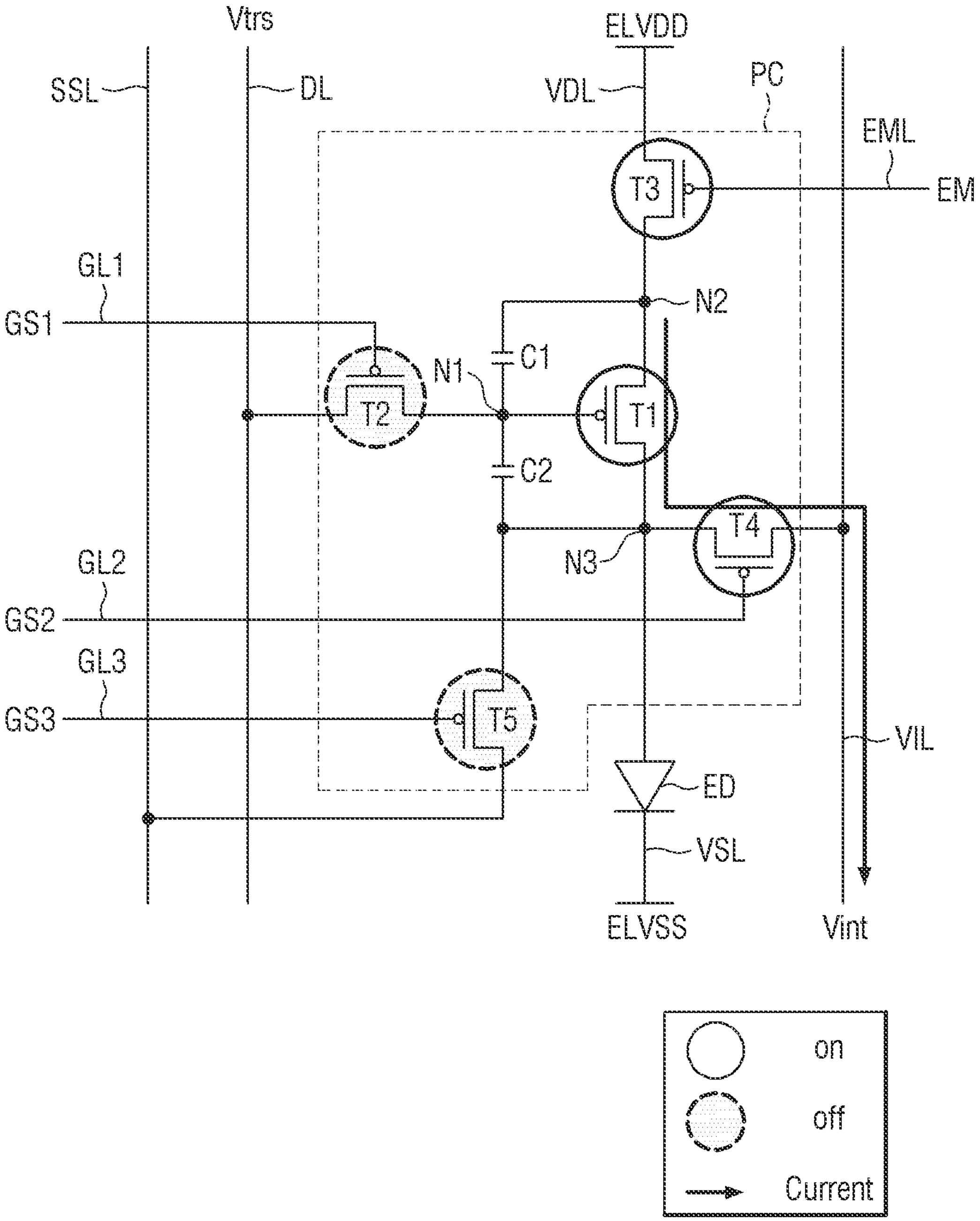
FIG. 14 illustrates operation of the display device of FIG. 6 in the bypass period of FIG. 11.

Operation of the display device in the bypass period P33 will be described with reference to FIGS. 11 and 14. FIG. 14 illustrates an operation of the display device in the bypass period P33 of FIG. 11. As shown in FIG. 11, in the bypass period P33, the emission signal EM and the second gate signal GS2 may each have the active level, while the first gate signal GS1 and the third gate signal GS3 may each have the non-active level. In addition, in the bypass period P33, the data voltage Vdt of the data line DL may be a transient data voltage Vtrs that changes (or transitions) from the previous data voltage Vdt1 to the current data voltage Vdt2.

As shown in FIG. 14, the first gate signal GS1 at the non-active level may be applied to the gate electrode of the second transistor T2 through the first gate line GL1. Accordingly, the second transistor T2 may be turned off.

As shown in FIG. 14, the second gate signal GS2 at the active level may be applied to the gate electrode of the fourth transistor T4 through the second gate line GL2. Accordingly, the fourth transistor T4 may be turned on.

As shown in FIG. 14, the emission signal EM at the active level may be applied to the gate electrode of the third transistor T3 through the emission line EML. Accordingly, the third transistor T3 may be turned on.

As shown in FIG. 14, the third gate signal GS3 at the non-active level may be applied to the gate electrode of the fifth transistor T5 through the third gate line GL3. Accordingly, the fifth transistor T5 may be turned off.

As shown in FIG. 14, the first transistor T1 may be turned on by the previous data voltage Vdt1.

During the bypass period P33, the first gate signal GS1 changes (or transitions) from the active level to the non-active level, and accordingly, the second transistor T2 may be turned on for a short period of time. Then, there may be a problem that the abnormal driving current generated by the transient voltage Vtrs of the data line DL may be supplied to the light emitting element ED. In order to prevent such a problem, the fourth transistor T4 is turned on during the bypass period P33, so that the abnormal driving current generated by the transient voltage Vtrs is not applied to the light-emitting element ED. For example, an abnormal driving current generated by the transient voltage Vtrs may be guided to a bypass path to the initialization line VIL through the turned-on fourth transistor T4.

Figure 15:
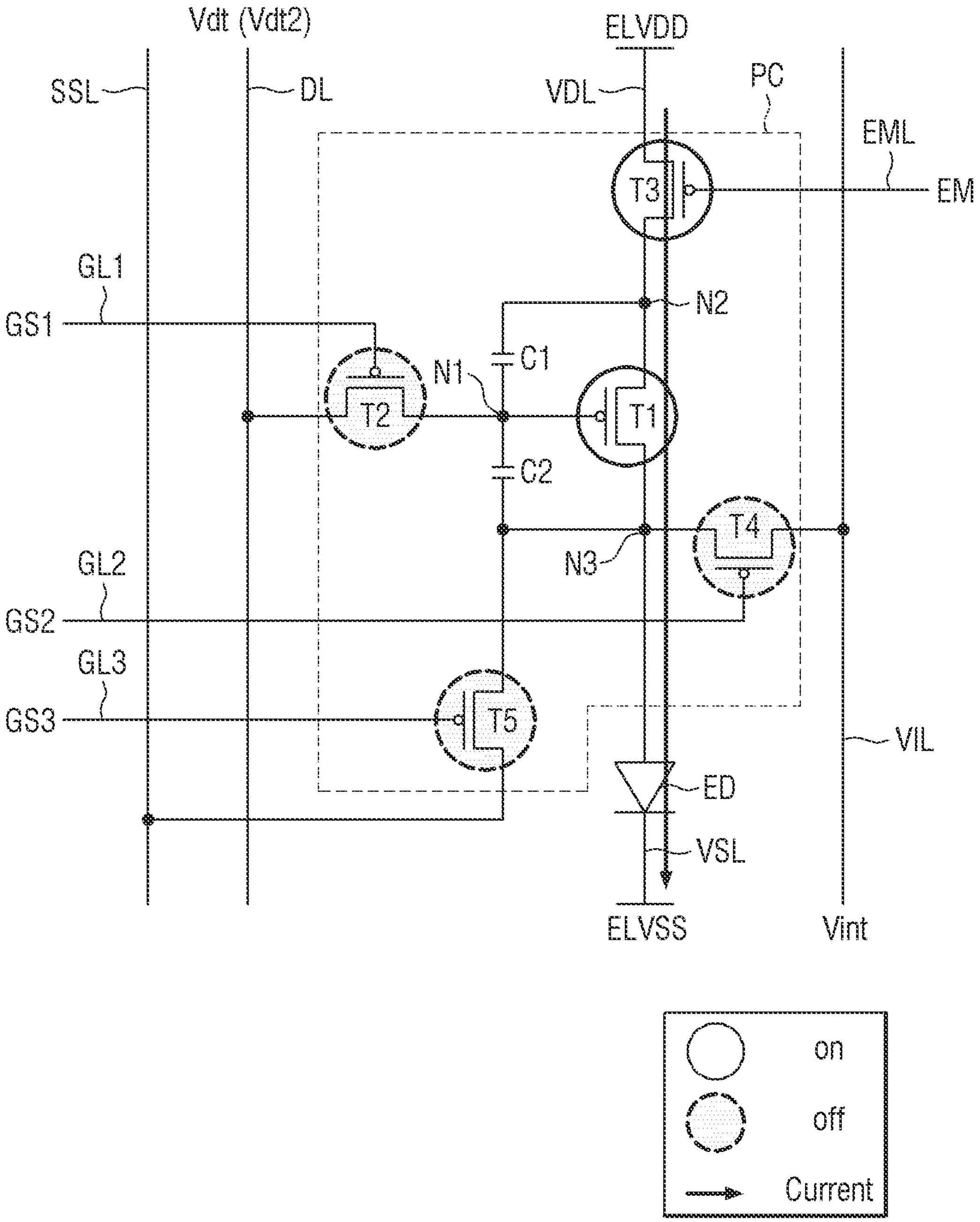
FIG. 15 illustrates operation of the display device of FIG. 6 in the emission period of FIG. 11.

Operation of the display device in the emission period P44 will be described with reference to FIGS. 11 and 15. FIG. 15 illustrates an operation of the display device in the emission period P44 of FIG. 11. As shown in FIG. 11, in the emission period P44, the emission signal EM may have the active level, while the first gate signal GS1, the second gate signal GS2, and the third gate signal GS3 may each have the non-active level. In addition, in the emission period P44, the current data voltage Vdt2 may be applied to the data line DL.

As shown in FIG. 15, the first gate signal GS1 at the non-active level may be applied to the gate electrode of the second transistor T2 through the first gate line GL1. Accordingly, the second transistor T2 may be turned off.

As shown in FIG. 15, the second gate signal GS2 at the non-active level may be applied to the gate electrode of the fourth transistor T4 through the second gate line GL2. Accordingly, the fourth transistor T4 may be turned off.

As shown in FIG. 15, the emission signal EM at the active level may be applied to the gate electrode of the third transistor T3 through the emission line EML. Accordingly, the third transistor T3 may be turned on.

As shown in FIG. 15, the third gate signal GS3 at the non-active level may be applied to the gate electrode of the fifth transistor T5 through the third gate line GL3. Accordingly, the fifth transistor T5 may be turned off.

As shown in FIG. 15, the first transistor T1 may be turned on by the current data voltage Vdt2.

A current path from the driving voltage line VDL to the common voltage line VSL may be generated through the turned-on third transistor T3 and the turned-on first transistor T1, and the driving current may flow through the current path. This driving current is supplied to the light-emitting element ED, and thus the light-emitting element ED can emit light having a luminance corresponding to the driving current.

It should be noted that all of the pixels PX of the display device including the emissive layer, the common electrode, etc. may simultaneously receive the third gate signals GS3 at the non-active level.

Figure 16:
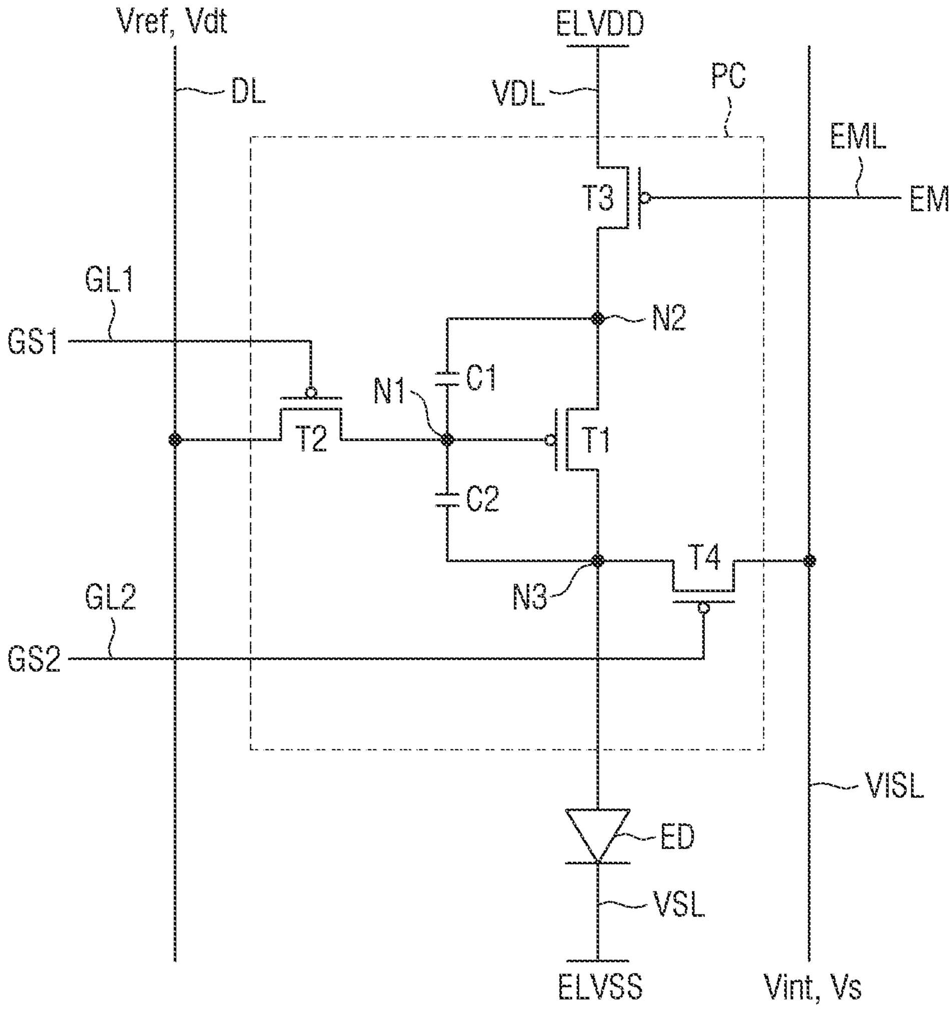
FIG. 16 is a circuit diagram of a pixel of a display device according to an embodiment of the present disclosure.

FIG. 16 is a circuit diagram of a pixel of a display device according to an embodiment of the present disclosure.

The pixel of FIG. 16 is substantially identical to the pixel of FIG. 6 except that the sensing line SSL and the fifth transistor T5 are eliminated and an initialization/sensing line VISL is connected to the fourth transistor T4. Redundant descriptions of elements already described above will be omitted from the following description of FIG. 16.

The fourth transistor T4 in FIG. 16 may be turned on by a second gate signal GS2 of the second gate line GL2 to electrically connect the third node N3 with the initialization/sensing line VISL. A gate electrode of the fourth transistor T4 may be electrically connected to the second gate line GL2, the source electrode thereof may be electrically connected to the third node N3, and the drain electrode thereof may be electrically connected to the initialization line/sensing VISL.

The initialization/sensing line VISL may be connected to, for example, the detector 230 described above. The initialization/sensing line VISL may transmit, for example, an initialization voltage Vinit during a certain period and a sensing voltage Vs during another period. In other words, the initialization/sensing line VISL may serve as the initialization line VIL and the sensing line SSL. In this instance, the initialization voltage Vinit of the initialization/sensing line VISL may have different voltages during different periods.

The initialization/sensing line VISL may be commonly connected to pixels PX in a column like the sensing line, e.g., the sensing line SSL1 of FIG. 5. In addition, there may be a plurality of initialization/sensing lines VISL like the sensing lines SSL1, SSL2, . . . of FIG. 5. A plurality of initialization/sensing lines VISL may respectively correspond to the plurality of columns. In this instance, the initialization/sensing lines VISL may not be connected with one another.

Figure 17:
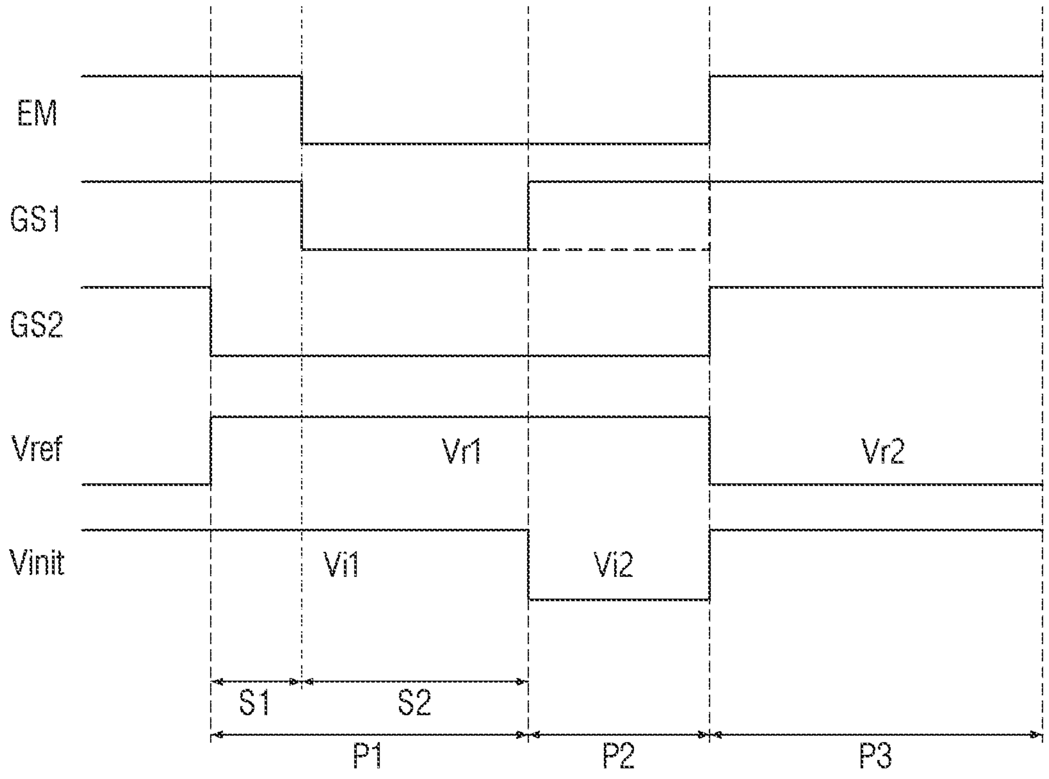
FIG. 17 is a timing diagram illustrating first to third gate signals, an emission signal, a reference voltage, and an initialization voltage Vinit of FIG. 16.

FIG. 17 is a timing diagram illustrating the first gate signal GS1, the second gate signal GS2, the emission signal EM, the reference voltage Vref, and the initialization voltage Vinit of FIG. 16. As in the example shown in FIG. 17, the display device 10 of the present disclosure may operate based on an initialization period P1, a sensing period P2, and an off period P3. FIG. 17 may particularly illustrate operation of the display device 10 for detection of defective pixels, e.g., during fabrication or testing of the display device, and the operation illustrated in FIG. 17 may not be used during normal operation of the display device 10, e.g., when the display device 10 displays an image.

The first gate signal GS1, the second gate signal GS2 and the emission signal EM may each have an active level or a non-active level during each period. The active levels of the signals GS1, GS2 and EM may refer to voltages at the levels that can turn on the respective transistors to which the signals are applied. In other words, a signal at the active level may have a value larger than the threshold voltage of the corresponding transistor. For example, as shown in FIG. 17, when each of the transistors T1 to T4 is a p-type transistor, the active level of each of the signals GS1, GS2 and EM may refer to a low level. The non-active level of each of the signals GS1, GS2 and EM may refer to a voltage at the level that can turn off the respective transistors. In other words, the signals at the non-active level may have a value smaller than the threshold voltages of the respective transistors. For example, as shown in FIG. 17, when each of the transistors T1 to T4 is a p-type transistor, the non-active level of each of the signals GS1, GS2 and EM may refer to a high level. When each of the transistor T1 to T4 is an n-type transistor, the active level of each of the signals GS1, GS2, and EM may refer to a high level, while the non-active level of each of the signals GS1, GS2 and EM may refer to a low level.

In the initialization period P1, the emission signal EM, the first gate signal GS1 and the second gate signal GS2 may each have the active level. For example, in most of the initialization period P1, the emission signal EM, the first gate signal GS1 and the second gate signal GS2 may each have the active level. In the initialization period P1, the emission signal EM, the first gate signal GS1 and the second gate signal GS2 may have the active level simultaneously for a certain period of time. In other words, in the initialization period P1, the active level of the emission signal EM, the active level of the first gate signal GS1 and the active level of the second gate signal GS2 may overlap one another for a certain period of time. In the initialization period P1, the reference voltage Vref may have a level of the first voltage Vr1. In addition, in the initialization period P1, the initialization voltage Vinit may have the level of the first voltage Vi1. The first voltage Vi1 of the initialization voltage Vinit may be, for example, a voltage lower than the supply voltage ELVDD.

The above-described initialization period P1 may include, for example, a first subsidiary period S1 and a second subsidiary period S2.

In the first subsidiary period S1, the emission signal EM and the first gate signal GS1 may each have the non-active level, while the second gate signal GS2 may have the active level. In addition, in the first subsidiary period S1, the reference voltage Vref may have the level of the first voltage Vr1. In addition, in the first subsidiary period S1, the initialization voltage Vinit may have the level of the first voltage Vi1.

In the second subsidiary period S2, the emission signal EM, the first gate signal GS1 and the second gate signal GS2 may each have the active level. In addition, in the second subsidiary period S2, the reference voltage Vref may have the level of the first voltage Vr1. In addition, in the second subsidiary period S2, the initialization voltage Vinit may have the level of the first voltage Vi1. A substantial initialization operation of the initialization period P1 may be performed, for example, in the second sub period S2.

In the sensing period P2, the emission signal EM and the second gate signal GS2 may each have the active level, while the first gate signal GS1 may have the non-active level. In addition, in the sensing period P2, the reference voltage Vref may have the level of the first voltage Vr1. In the sensing period P2, the initialization voltage Vinit may have a level of a second voltage Vi2. The second voltage Vi2 of the initialization voltage Vinit may be smaller than the above-described supply voltage ELVDD. For example, the second voltage Vi2 of the initialization voltage Vinit may be greater than the common voltage ELVSS and less than the first voltage Vi1 of the initialization voltage Vinit. Incidentally, according to an embodiment of the present disclosure, the first gate signal GS1 may have the active level rather than the non-active level in the sensing period P2.

In the off period P3, the emission signal EM, the first gate signal GS1 and the second gate signal GS2 may each have the non-active level. In addition, in the off period P3, the reference voltage Vref may have a level of the second voltage Vr2. In addition, in the off period P3, the initialization voltage Vinit may have the level of the first voltage Vi1.

Figure 18:
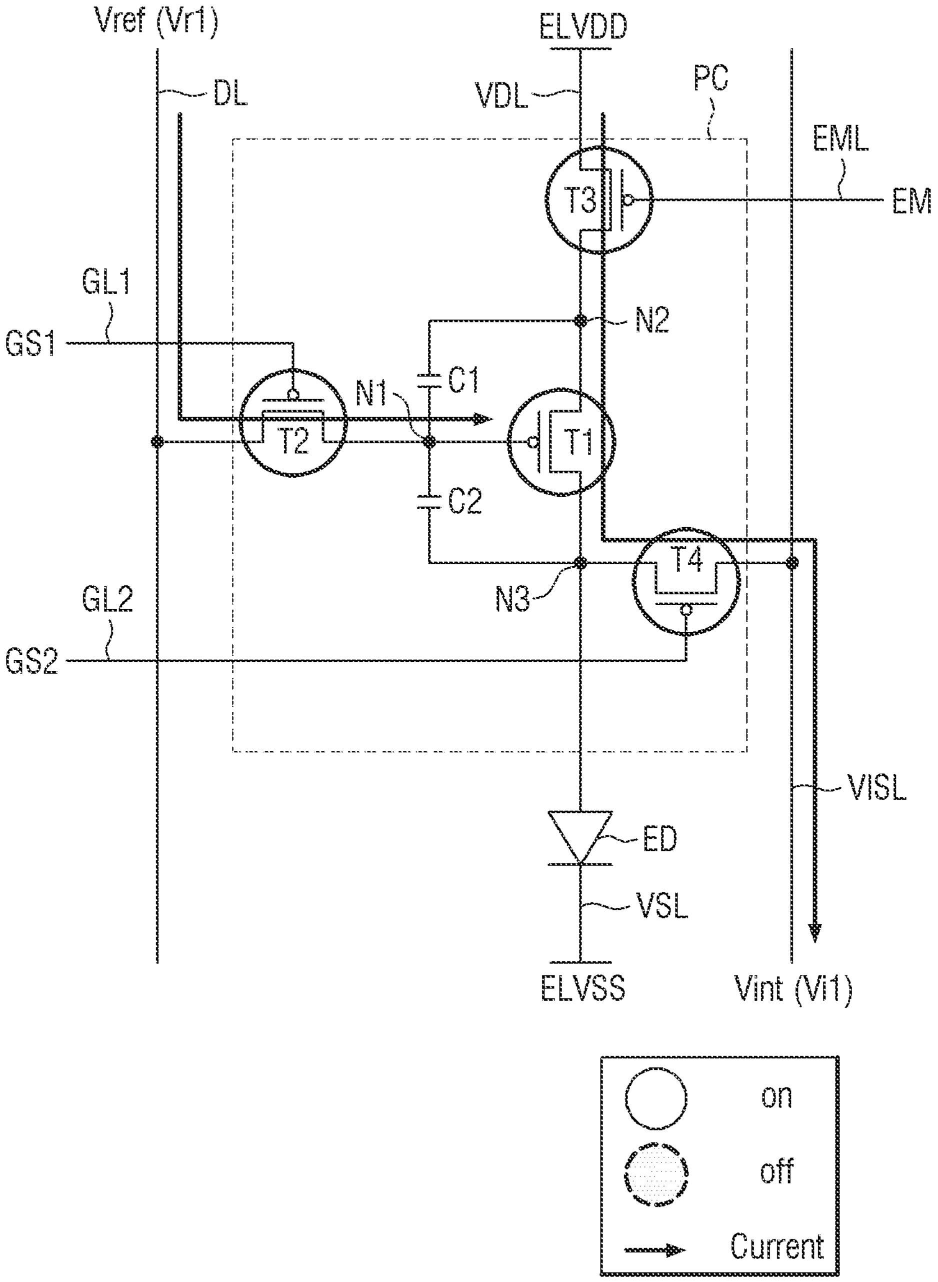
FIG. 18 illustrates operation of the display device in the initialization period of FIG. 17.
Figure 19:
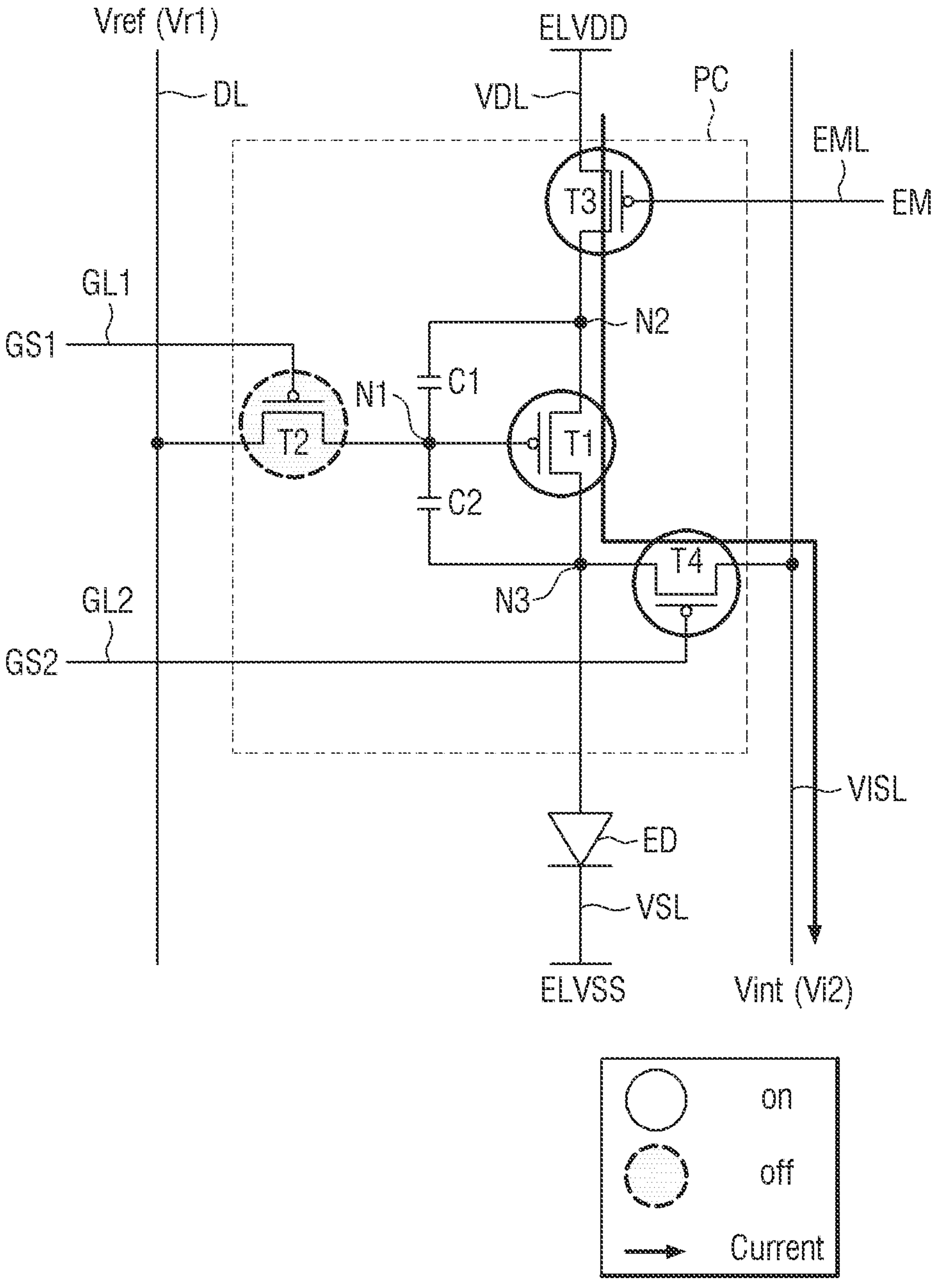
FIG. 19 illustrates operation of the display device in the sensing period of FIG. 17.
Figure 20:
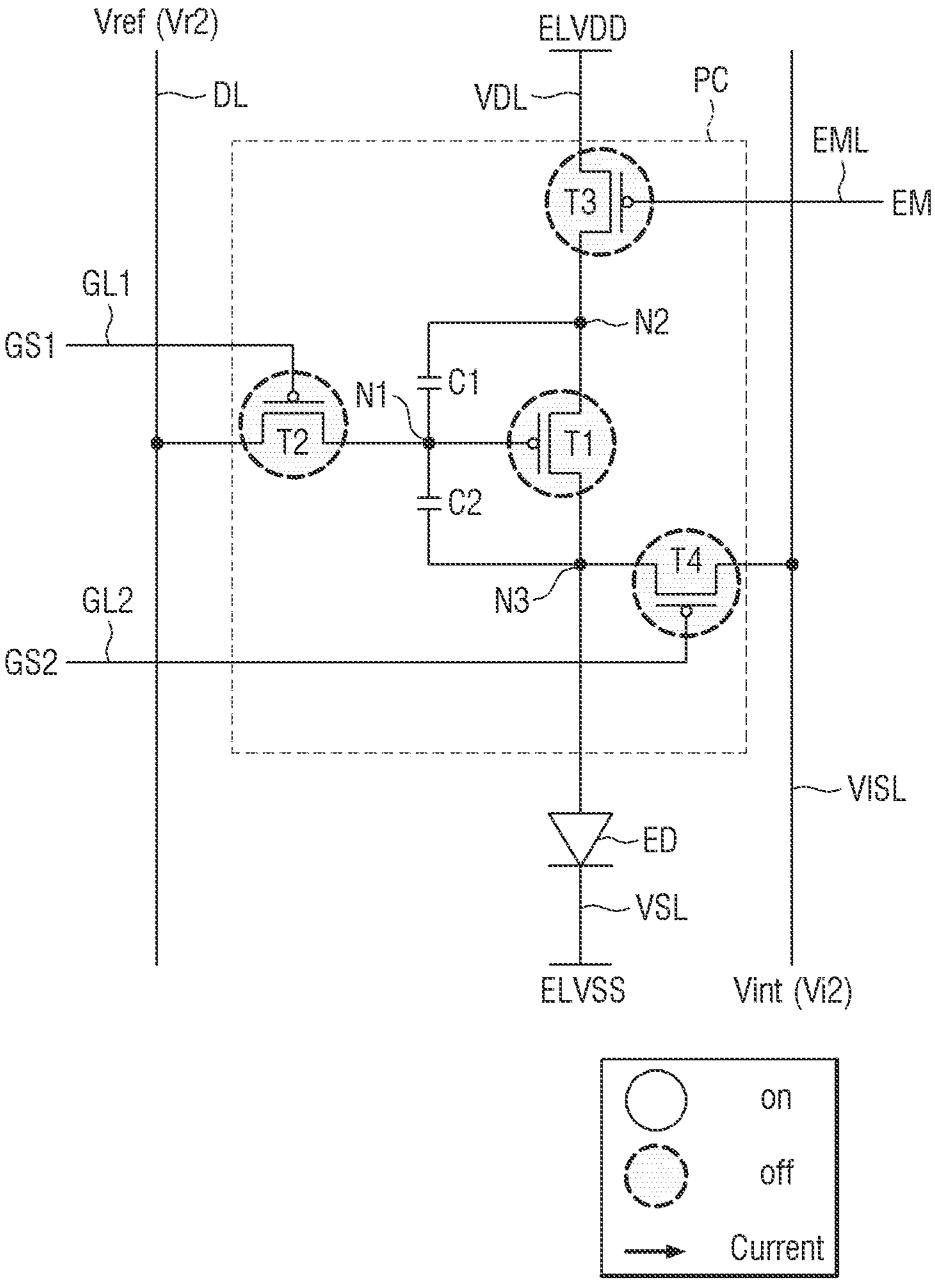
FIG. 20 illustrates operation of the display device in the off period of FIG. 17.

Operations of the display device according to an embodiment of the present disclosure will be described with reference to FIGS. 17 to 20. In FIGS. 18 to 20, a transistor surrounded by a circle of a relatively thick line indicates that the transistor is turned on. On the other hand, a transistor surrounded by a dashed circle indicates that the transistor is turned off. In addition, arrows in FIGS. 18 to 20 indicate current flows. The display device of FIGS. 18 to 20 may not include an emission layer. For example, the light-emitting element of the display device of FIGS. 18 to 20 may include an anode electrode and no emissive layer or no common electrode. In other words, the light-emitting element of the display device of FIGS. 18 to 20 receiving the signals according to FIG. 17 may include a pixel electrode and may not include an emissive layer and a common electrode.

Operation of the display device in the initialization period P1 will be described with reference to FIGS. 17 and 18.

FIG. 18 illustrates an operation of the display device in the initialization period P1 of FIG. 17.

As shown in FIG. 17, in the second subsidiary period S2 of the initialization period P1, the emission signal EM, the first gate signal GS1 and the second gate signal GS2 may each have the active level. In addition, in the second subsidiary period S2, the reference voltage Vref may have the level of the first voltage Vr1, and the initialization voltage Vinit may have the level of the first voltage Vi1.

As shown in FIG. 18, the first gate signal GS1 at the active level may be applied to the gate electrode of the second transistor T2 through the first gate line GL1. Accordingly, the second transistor T2 may be turned on.

As shown in FIG. 18, the second gate signal GS2 at the active level may be applied to the gate electrode of the fourth transistor T4 through the second gate line GL2. Accordingly, the fourth transistor T4 may be turned on.

As shown in FIG. 18, the emission signal EM at the active level may be applied to the gate electrode of the third transistor T3 through the emission line EML. Accordingly, the third transistor T3 may be turned on.

As the second transistor T2, the third transistor T3 and the fourth transistor T4 are turned on during the initialization period P1, the gate electrode of the first transistor T1 (e.g., the first node N1), the source electrode of the first transistor T1 (e.g., the second node N2), and the drain electrode of the first transistor T1 (e.g., the third node N3) may be initialized. For example, the first voltage Vr1 from the data line DL may be applied through the turned-on second transistor T2 to the first node N1, which is the gate electrode of the first transistor T1. In addition, the supply voltage ELVDD from the driving voltage line VDL may be applied through the turned-on third transistor T3 to the second node N2 that is the source electrode of the first transistor T1. In addition, the first voltage Vi1 from an initialization/sensing line VISL may be applied through the turned-on fourth transistor T4 to the third node N3 that is the drain electrode of the first transistor T1. Accordingly, the voltage of each of the gate electrode of the first transistor T1, the source electrode of the first transistor T1, and the drain electrode of the first transistor T1 may be initialized. For example, the gate electrode of the first transistor T1 may be initialized to the first data voltage Vr1 of the reference voltage Vref, the source electrode of the first transistor T1 may be initialized to the supply voltage ELVDD, and the drain electrode of the first transistor T1 (or the anode electrode of the light-emitting element ED) may be initialized to the first voltage Vi1 of the initialization voltage Vinit.

In addition, the first transistor T1 is a p-type transistor, and the first voltage Vr1 of the reference voltage Vref applied to the first node N1, which is the gate electrode of the first transistor T1, is smaller than the supply voltage ELVDD applied to the source electrode of the first transistor T1. Accordingly, during the initialization period P1, the gate-source voltage of the first transistor T1 may be a voltage of negative polarity. Accordingly, in the initialization period P1, the first transistor T1 may be turned on by the gate-source voltage of negative polarity. Therefore, a current path may be generated between the driving voltage line VDL and the initialization/sensing line VISL through the turned-on first transistor T1. The voltages of the source and drain electrodes of the first transistor T1 may also be initialized by the current flowing along the current path.

Operation of the display device in the sensing period P2 will be described with reference to FIGS. 17 and 19. FIG. 19 illustrates an operation of the display device in the sensing period P2 of FIG. 17.

As shown in FIG. 17, the emission signal EM and the second gate signal GS2 may each have the active level, while the first gate signal GS1 may have the non-active level. In addition, in the sensing period P2, the reference voltage Vref may have the level of the first voltage Vr1, and the initialization voltage Vinit may have the level of the second voltage Vi2.

As shown in FIG. 19, the first gate signal GS1 at the non-active level may be applied to the gate electrode of the second transistor T2 through the first gate line GL1. Accordingly, the second transistor T2 may be turned off.

As shown in FIG. 19, the second gate signal GS2 at the active level may be applied to the gate electrode of the fourth transistor T4 through the second gate line GL2. Accordingly, the fourth transistor T4 may be turned on.

As shown in FIG. 19, the emission signal EM at the active level may be applied to the gate electrode of the third transistor T3 through the emission line EML. Accordingly, the third transistor T3 may be turned on.

As the second transistor T2 is turned off, the first node N1, which is the gate electrode of the first transistor T1, may be electrically floating, and the first voltage Vr1 of the reference voltage Vref applied during a previous period (e.g., the initialization period P1) may be maintained at the floating first node N1. At this time, the first voltage Vr1 of the first node N1 may be maintained by a first capacitor C1. By the first voltage Vr1 of the reference voltage Vref maintained by the first capacitor C1, the first transistor T1 may remain turned on.

The second capacitor C2 may compensate for the magnitude of the driving current according to the deviations of the threshold voltage of the first transistor T1 for each of the pixels PX.

As described above, as the third transistor T3, the first transistor T1 and the fourth transistor T4 are turned on, a current path may be formed between the driving voltage line VDL and the initialization/sensing line VISL through the third transistor T3, the first transistor T1 and the fourth transistor T5. Therefore, a current (e.g., sensing current) flowing along the driving voltage line, the third transistor T3, the first transistor T1, the fourth transistor T4 and the initialization/sensing line VISL may be formed. This sensing current may be provided to the detector 230 through the initialization/sensing line VISL. The detector 230 may receive the sensing current flowing through the third transistor T3, the first transistor T1 and the fourth transistor T4 via the initialization/sensing line VISL and may determine whether the pixel PX is defective based on the received sensing current. The operation of the detector 230 for determining whether a pixel is defective has been described above with reference to FIG. 9.

Operation of the display device in the off period P3 will be described with reference to FIGS. 17 and 20. FIG. 20 illustrates an operation of the display device in the off period P3 of FIG. 17.

As shown in FIG. 17, in the off period P3, the emission signal EM, the first gate signal GS1 and the second gate signal GS2 may each have the non-active level. In addition, in the off period P3, the reference voltage Vref may have the level of the second voltage Vr2, and the initialization voltage Vinit may have the level of the second voltage Vi2.

As shown in FIG. 20, the first gate signal GS1 at the non-active level may be applied to the gate electrode of the second transistor T2 through the first gate line GL1. Accordingly, the second transistor T2 may be turned off.

As shown in FIG. 20, the second gate signal GS2 at the non-active level may be applied to the gate electrode of the fourth transistor T4 through the second gate line GL2. Accordingly, the fourth transistor T4 may be turned off.

As shown in FIG. 20, the emission signal EM at the non-active level may be applied to the gate electrode of the third transistor T3 through the emission line EML. Accordingly, the third transistor T3 may be turned off.

As shown in FIG. 20, the first transistor T1 may be turned off.

Pixels in one column commonly connected to one sensing line may be sequentially connected to the sensing line. For example, as shown in FIG. 5, a plurality of pixels PX in the first column CL1 may be sequentially connected to a first sensing line SSL1. Specifically, let us define three pixels PX in the first column as a first pixel, a second pixel and a third pixel in the reverse order in the second direction DR2 from the top side. The second gate signal GS2 may be first applied to the fourth transistor T4 of the first pixel, then the second gate signal GS2 may be applied to the fourth transistor T4 of the second pixel, and then the second gate signal GS2 may be applied to the fourth transistor T4 of the third pixel in this order. Accordingly, the sensing voltages Vs of the pixels PX of the first column CL1 may be sequentially applied to the first sensing line SSL1. This same process may be applied to a column of pixels connected to the same initialization/sensing line VISL of FIG. 16.

The display device 10 of the present disclosure may be fabricated to include an emissive layer on a pixel electrode, a common electrode on the emissive layer, an encapsulation layer ENC on the common electrode, and a color filter layer CFL on the encapsulation layer ENC. After such fabrication, performing the above-described inspection process of FIGS. 17 to 20 may determine whether pixels are defective. After passing the inspection, the display device including the emissive layer and the common electrode may operate based on an initialization/write period P11, a compensation period P22, a bypass period P33 and an emission period P44, as in the example shown in FIG. 11. For example, after the off period, the display device 10 of the present disclosure may operate based on the initialization/write period P11, the compensation period P22, the bypass period P33, and the emission period P44 of FIG. 11. In other words, the emission signal EM, the first gate signal GS1, the second gate signal GS2, the data voltage Vdt and the initialization voltage Vinit as in FIG. 11 described above may be applied to the display device of FIG. 16 that further includes the emissive layer, the common electrode, etc. The third gate signal GS3 is not applied or needed for the display device of FIG. 16. In addition, an initialization/sensing line VISL of the display device including the emissive layer, the common electrode, etc. may be connected to the detector 230 or the power supply unit 500 and may receive the initialization voltage Vinit from the detector 230 or the power supply unit 500.

Figure 21:
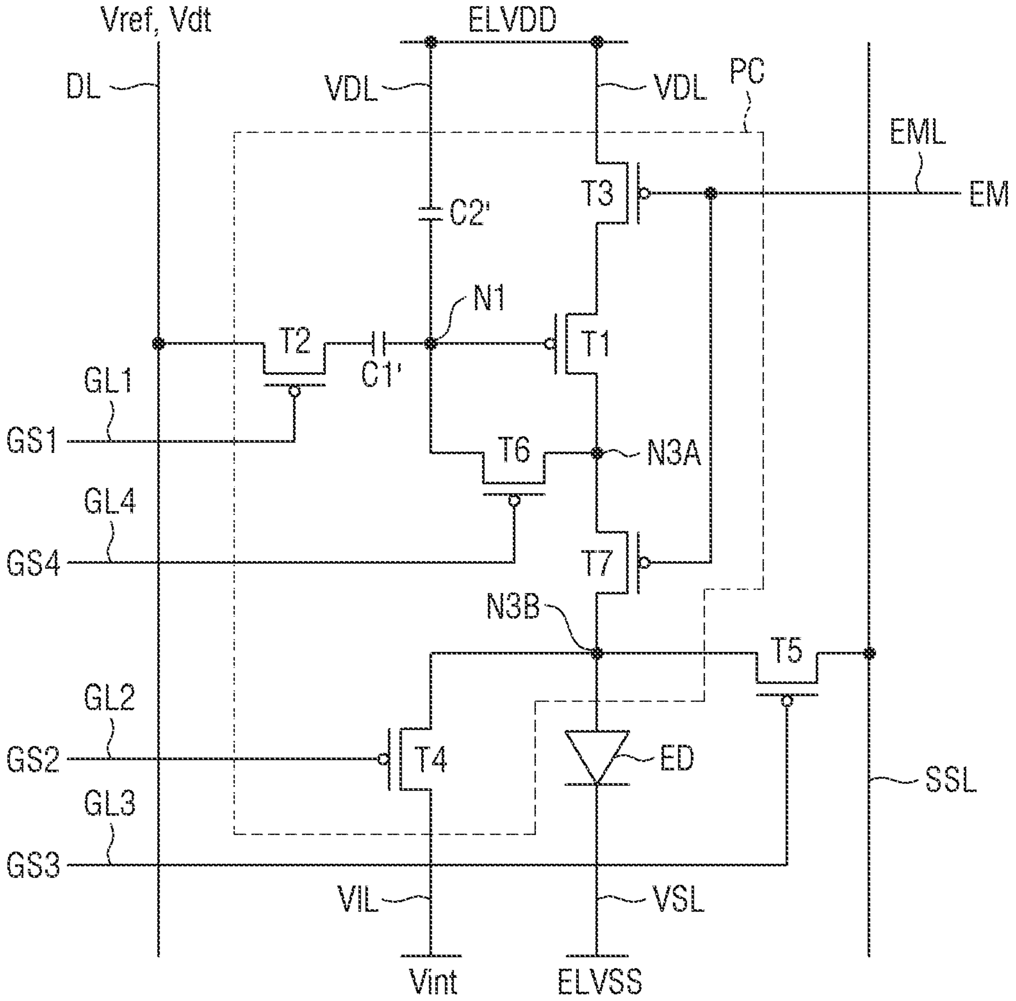
FIG. 21 is a circuit diagram of a pixel of a display device according to an embodiment of the present disclosure.

FIG. 21 is a circuit diagram of a pixel of a display device according to an embodiment of the present disclosure.

As shown in FIG. 21, a pixel PX may be connected to a first gate line GL1, a second gate line GL2, a third gate line GL3, a fourth gate line GL4, a sensing line SSL, an initialization line VIL, an emission line EML, a data line DL, a driving voltage line VDL, and a common voltage line VSL. The common voltage line VSL may be connected to a common electrode (e.g., a cathode electrode) of a light-emitting element ED. The pixel PX may include a pixel circuit PC and the light-emitting element ED. The pixel circuit PC may include a first transistor T1, a second transistor T2, a third transistor T3, a fourth transistor T4, a fifth transistor T5, a sixth transistor T6, a seventh transistor T7, a first capacitor C1', and a second capacitor C2'.

The first transistor T1 (e.g., a driving transistor) may include a gate electrode, a source electrode, and a drain electrode. The first transistor T1 may control a source-drain current (hereinafter referred to as a driving current) according to a data voltage Vdt applied to the gate electrode. The driving current (e.g., Isd) flowing through the channel region of the first transistor T1 may be proportional to the square of the difference between the threshold voltage Vth and the voltage Vsg between the source electrode and the gate electrode of the first transistor T1 ($Isd=k\times(Vsg-Vth)^2$), where k denotes a proportional coefficient determined by the structure and physical properties of the first transistor T1, Vsg denotes the source-gate voltage of the first transistor T1, and Vth denotes the threshold voltage of the first transistor T1. The gate electrode of the first transistor T1 may be connected to a first node N1, the source electrode of the first transistor T1 may be connected to a drain electrode of the third transistor T3, and the drain electrode of the first transistor T1 may be connected to a node N3A.

The light-emitting element ED may receive the driving current to emit light. The amount or the luminance of the light emitted from the light-emitting element ED may be proportional to or otherwise depend on the magnitude of the driving current Isd. The light-emitting element ED may be an organic light-emitting diode including a first electrode, a second electrode, and an organic light-emitting layer disposed between the first electrode and the second electrode. Alternatively, the light-emitting element ED may be an inorganic light-emitting element including a first electrode, a second electrode, and an inorganic semiconductor disposed between the first electrode and the second electrode. Alternatively, the light-emitting element ED may be a quantum-dot light-emitting element including a first electrode, a second electrode, and a quantum-dot emissive layer between the first electrode and the second electrode. As another example, the light-emitting element ED may be a micro light-emitting diode. The first electrode of the light-emitting element ED may be electrically connected to a node N3B. The second electrode of the light-emitting element ED may be connected to the common voltage line VSL. The second electrode of the light-emitting element ED may receive a common voltage ELVSS from the common voltage line VSL.

The second transistor T2 may be turned on by a first gate signal GS1 of the first gate line GL1 to electrically connect the data line DL with a second electrode of the first capacitor C1'. The gate electrode of the second transistor T2 may be electrically connected to the first gate line GL1, the source electrode of the second transistor T2 may be electrically connected to the data line DL, and the drain electrode of the second transistor T2 may be electrically connected to the second electrode of the first capacitor C1'. The data line DL may transmit a data voltage Vdt or a reference voltage Vref.

The sixth transistor T6 may be turned on by a fourth gate signal GS4 of the fourth gate line GL4 to electrically connect the first node N1 with the node N3A. The gate electrode of sixth transistor T6 may be connected to the fourth gate line GL4, the source electrode of the sixth transistor T6 may be electrically connected to the first node N1, and the drain electrode of the sixth transistor may be electrically connected to the node N3A.

The seventh transistor T7 may be turned on by the emission signal EM of the emission line EML to electrically connect the node N3A with a node N3B. The gate electrode of the seventh transistor T7 may be electrically connected to the emission line EML, the source electrode of the seventh transistor T7 may be electrically connected to the node N3A, and the drain electrode of the seventh transistor T7 may be electrically connected to the node N3B.

The fourth transistor T4 may be turned on by the second gate signal GS2 of the second gate line GL2 to electrically connect the node N3B with the initialization line VIL. A gate electrode of the fourth transistor T4 may be electrically connected to the second gate line GL2, the source electrode of the fourth transistor T4 may be electrically connected to the node N3B, and the drain electrode of the fourth transistor T4 may be electrically connected to the initialization line VIL. There may be a plurality of initialization lines VIL, and the plurality of initialization lines VIL may be connected with one another. For example, the initialization lines VIL may include a plurality of horizontal initialization lines VIL that extend in the first direction DR1 and are arranged in the second direction DR2, and a plurality of vertical initialization lines VIL that extend in the second direction DR2 and are arranged in the first direction DR1. The horizontal initialization lines VIL and the vertical initialization lines VIL may be connected to each other.

The third transistor T3 may be turned on by the emission signal EM of the emission line EML to electrically connect the driving voltage line VDL with the source electrode of the first transistor T1. A gate electrode of the third transistor T3 may be electrically connected to the emission line EML, the source electrode of the third transistor T3 may be electrically connected to the driving voltage line VDL, and the drain electrode of the third transistor T3 may be electrically connected to the source electrode of the first transistor T1.

The fifth transistor T5 may be turned on by a third gate signal GS3 of the third gate line GL3 to electrically connect the node N3B with the sensing line SSL. A gate electrode of the fifth transistor T5 may be electrically connected to the third gate line GL3, the source electrode of the fifth transistor T5 may be electrically connected to the node N3B, and the drain electrode of the fifth transistor T5 may be electrically connected to the sensing line SSL.

The second capacitor C2' may be electrically connected between the first node N1 and the driving voltage line VDL. For example, a first electrode of the second capacitor C2' may be electrically connected to the first node N1, and a second electrode of the second capacitor C2' may be electrically connected to the driving voltage line VDL. The second capacitor C2' may store, for example, the reference voltage Vref or the data voltage Vdt supplied from the data line DL through the second transistor T2.

The first capacitor C1' may be electrically connected between the first node N1 and the drain electrode of the second transistor T2. For example, a first electrode of the first capacitor C1' may be electrically connected to the first node N1, and a second electrode of the first capacitor C1' may be electrically connected to the drain electrode of the second transistor T2. The first capacitor C1' may maintain the threshold voltage of the first transistor T1 detected by the sixth transistor T6.

When the third transistor T3, the first transistor T1 and the seventh transistor T7 are turned on, a driving current is supplied to the light-emitting element ED so that the light-emitting element ED can emit light.

At least one of the above-described first to seventh transistors T1 to T7 may be a metal-oxide-semiconductor field effect transistor (MOSFET). For example, each of the first to seventh transistors T1 to T7 may be a p-type MOSFET. As another example, each of the first to seventh transistors T1 to T7 may be an n-type MOSFET. As yet another example, some of the first to seventh transistors T1 to T7 may be p-type MOSFETs, while the other transistors may be n-type MOSFETs.

Figure 22:
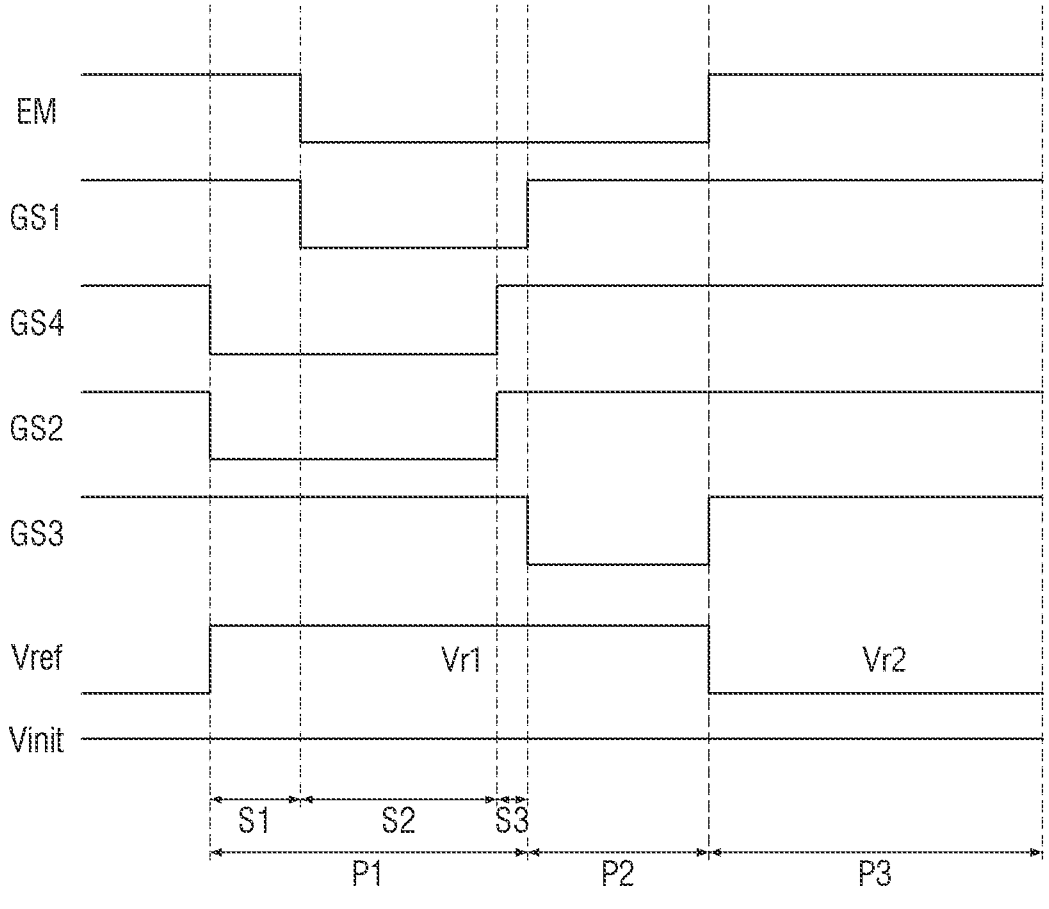
FIG. 22 is a timing diagram illustrating first to fourth gate signals, an emission signal, a reference voltage, and an initialization voltage Vinit of FIG. 21.

FIG. 22 is a timing diagram illustrating the first to fourth gate signals GS1 to GS4, the emission signal EM, the reference voltage Vref, and the initialization voltage Vinit of FIG. 21. As in the example shown in FIG. 22, the display device 10 of the present disclosure may operate based on an initialization period P1, a sensing period P2, and an off period P3. FIG. 22 may particularly illustrate operation of the display device 10 for detection of defective pixels, e.g., during fabrication or testing of the display device, and the operation illustrated in FIG. 22 may not be used during normal operation of the display device 10, e.g., when the display device 10 displays an image.

The first gate signal GS1, the second gate signal GS2, the third gate signal GS3, the fourth gate signal GS4 and the emission signal EM may have an active level or a non-active level for each period. The active level of each of the signals GS1, GS2, GS3, GS4 and EM may refer to a voltage at the level that can turn on the respective transistors to which the signals are applied. In other words, the signals at the active level may have a value larger than the threshold voltages of the respective transistors. For example, as shown in FIG. 22, when each of the transistors T1 to T7 is a p-type transistor, the active level of each of the signals GS1, GS2, GS3, GS4 and EM may refer to a low level. The non-active level of each of the signals GS1, GS2, GS3, GS4 and EM may refer to a voltage at the level that can turn off the respective transistors. In other words, the signals at the non-active level may have a value smaller than the threshold voltages of the respective transistors. For example, as shown in FIG. 22, when each of the transistors T1 to T7 is a p-type transistor, the non-active level of each of the signals GS1, GS2, GS3, GS4 and EM may refer to a high level. When each of the transistor T1 to T7 is an n-type transistor, the active level of each of the signals may refer to a high level, while the non-active level of each of the signals GS1, GS2, GS3, GS4 and EM may refer to a low level.

In the initialization period P1, the emission signal EM, the first gate signal GS1, the second gate signal GS2 and the fourth gate signal GS4 may each have the active level, while the third gate signal GS3 may have the non-active level. For example, in most of the initialization period P1, the emission signal EM, the first gate signal GS1, the second gate signal GS2 and the fourth gate signal GS4 may each have the active level, while the third gate signal GS3 may have the non-active level. At this time, for a certain period of time in the initialization period P1, the emission signal EM, the first gate signal GS1, the second gate signal GS2 and the fourth gate signal GS4 may each have the active level, while the third gate signal GS3 may have the non-active level simultaneously. In other words, in the initialization period P1, the active level of the emission signal EM, the active level of the first gate signal GS1, the active level of the second gate signal GS2, the active level of the fourth gate signal GS4 and the non-active level of the third gate signal GS3 may overlap one another for a certain period of time. In the initialization period P1, the reference voltage Vref may have a level of the first voltage Vr1. The first voltage Vr1 of the reference voltage Vref may be less than the supply voltage ELVDD, for example.

The above-described initialization period P1 may include, for example, a first subsidiary period S1, a second subsidiary period S2, and a third subsidiary period S3.

In the first subsidiary period S1, the emission signal EM, the first gate signal GS1 and the third gate signal GS3 may each have the non-active level, while the second gate signal GS2 and the fourth gate signal GS4 may each have the active level. In addition, in the first subsidiary period S1, the reference voltage Vref may have the level of the first voltage Vr1.

In the second subsidiary period S2, the emission signal EM, the first gate signal GS1, the second gate signal GS2 and the fourth gate signal GS4 may each have the active level, while the third gate signal GS3 may have the non-active level. In addition, in the second subsidiary period S2, the reference voltage Vref may have the level of the first voltage Vr1. A substantial initialization operation of the initialization period P1 may be performed, for example, in the second sub period S2.

In the third subsidiary period S3, the emission signal EM and the first gate signal GS1 may each have the active level, while the second gate signal GS2, the third gate signal GS3 and the fourth gate signal GS4 may have the non-active level. In addition, in the third subsidiary period S3, the reference voltage Vref may have the level of the first voltage Vr1.

In the sensing period P2, the emission signal EM and the third gate signal GS3 may each have the active level, while the first gate signal GS1, the second gate signal GS2 and the fourth gate signal GS4 may each have the non-active level. In addition, in the sensing period P3, the reference voltage Vref may have the level of the first voltage Vr1.

In the off period P3, the emission signal EM, the first gate signal GS1, the second gate signal GS2, the third gate signal GS3, and the fourth gate signal GS4 may each have the non-active level. In addition, in the off period P3, the reference voltage Vref may have a level of the second voltage Vr2.

Incidentally, the initialization voltage Vinit may be maintained at a constant level during all of the periods including the initialization period P1, the sensing period P2 and the off period P3. For example, the initialization voltage Vinit may be a DC voltage always having a constant level regardless of the period. Herein, the initialization voltage Vinit may be, for example, a DC voltage greater than the common voltage ELVSS and less than the supply voltage ELVDD.

Figure 23:
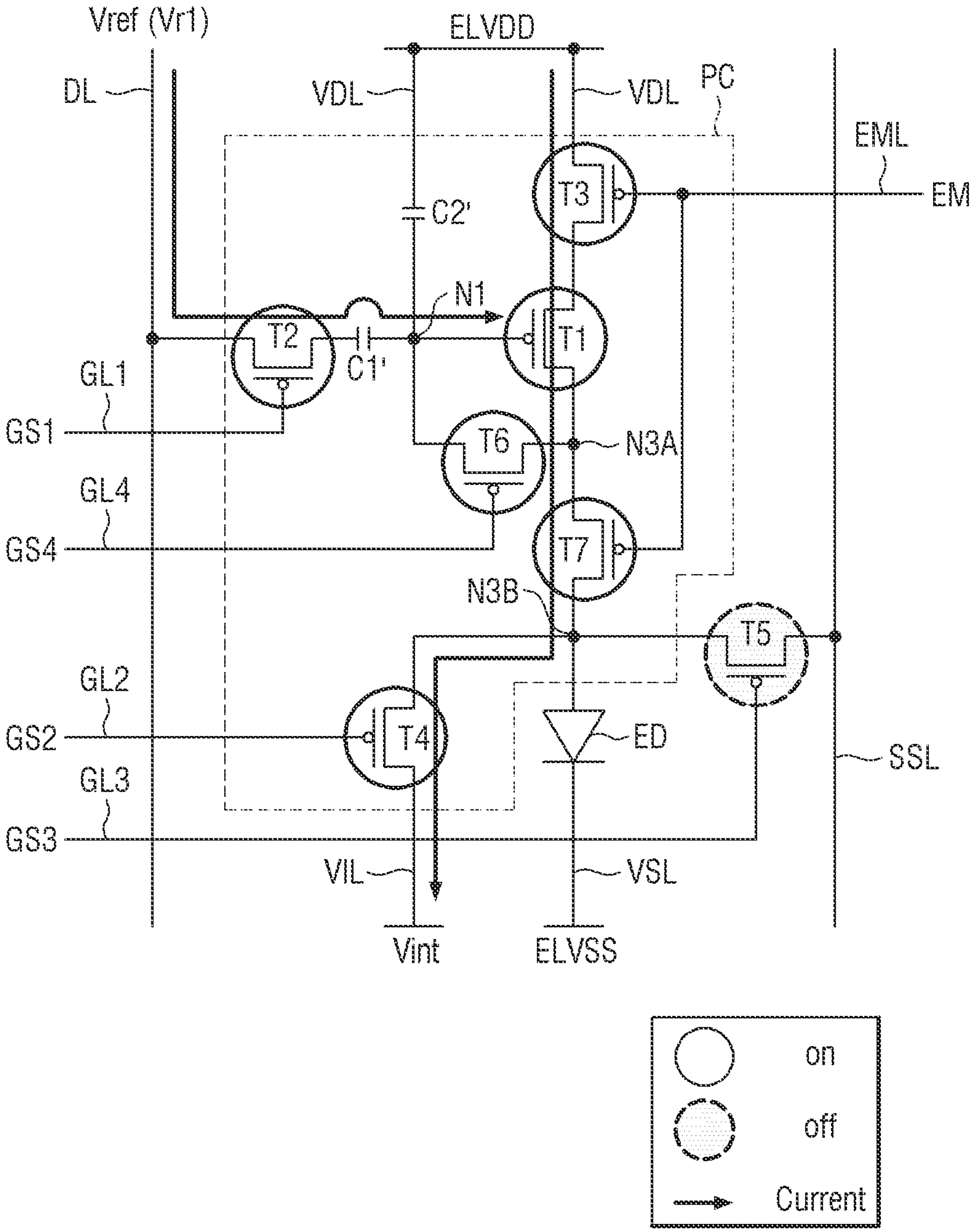
FIG. 23 illustrates operation of the display device of FIG. 21 in the initialization period of FIG. 22.
Figure 24:
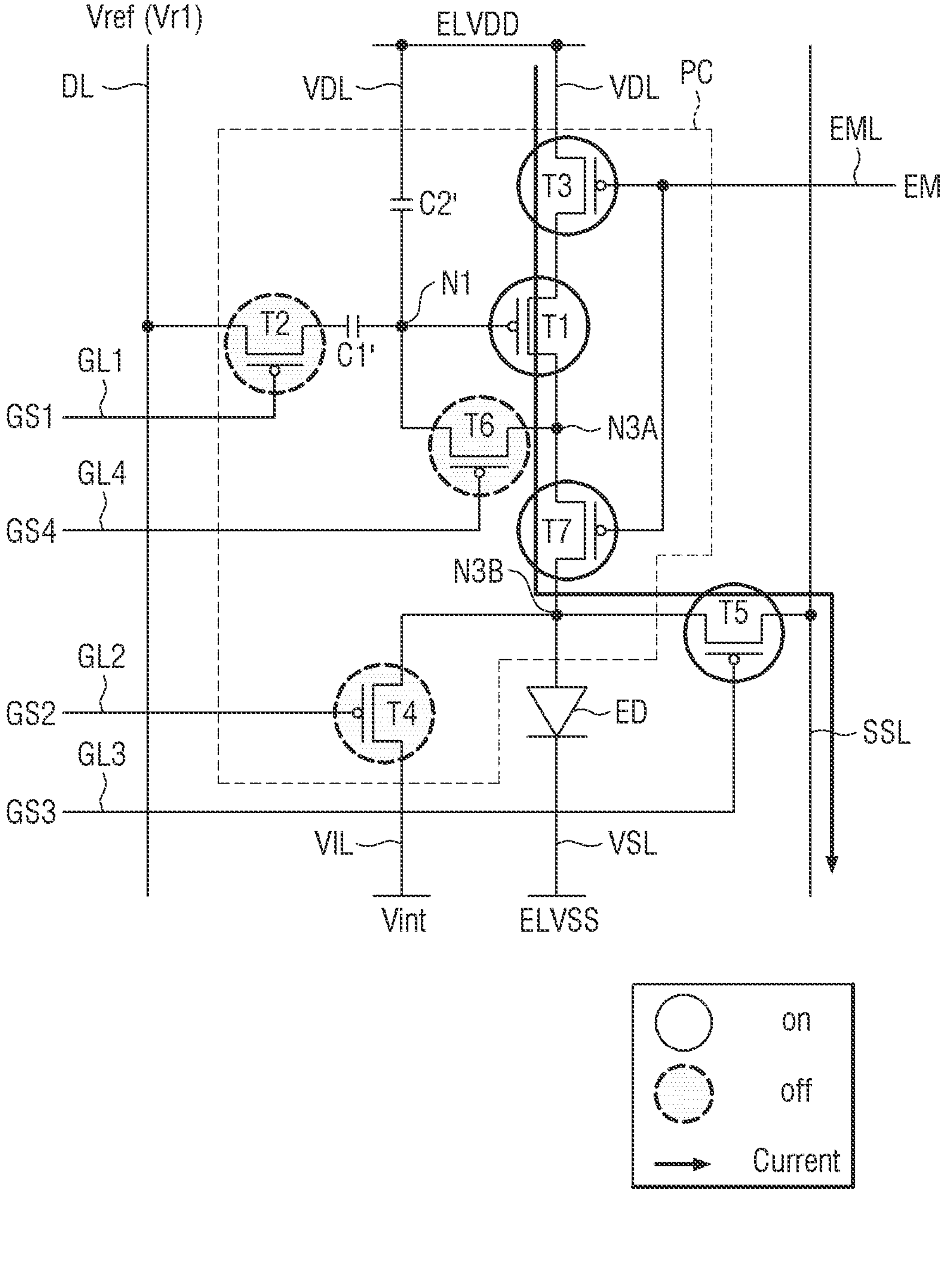
FIG. 24 illustrates operation of the display device of FIG. 21 in the sensing period of FIG. 22.
Figure 25:
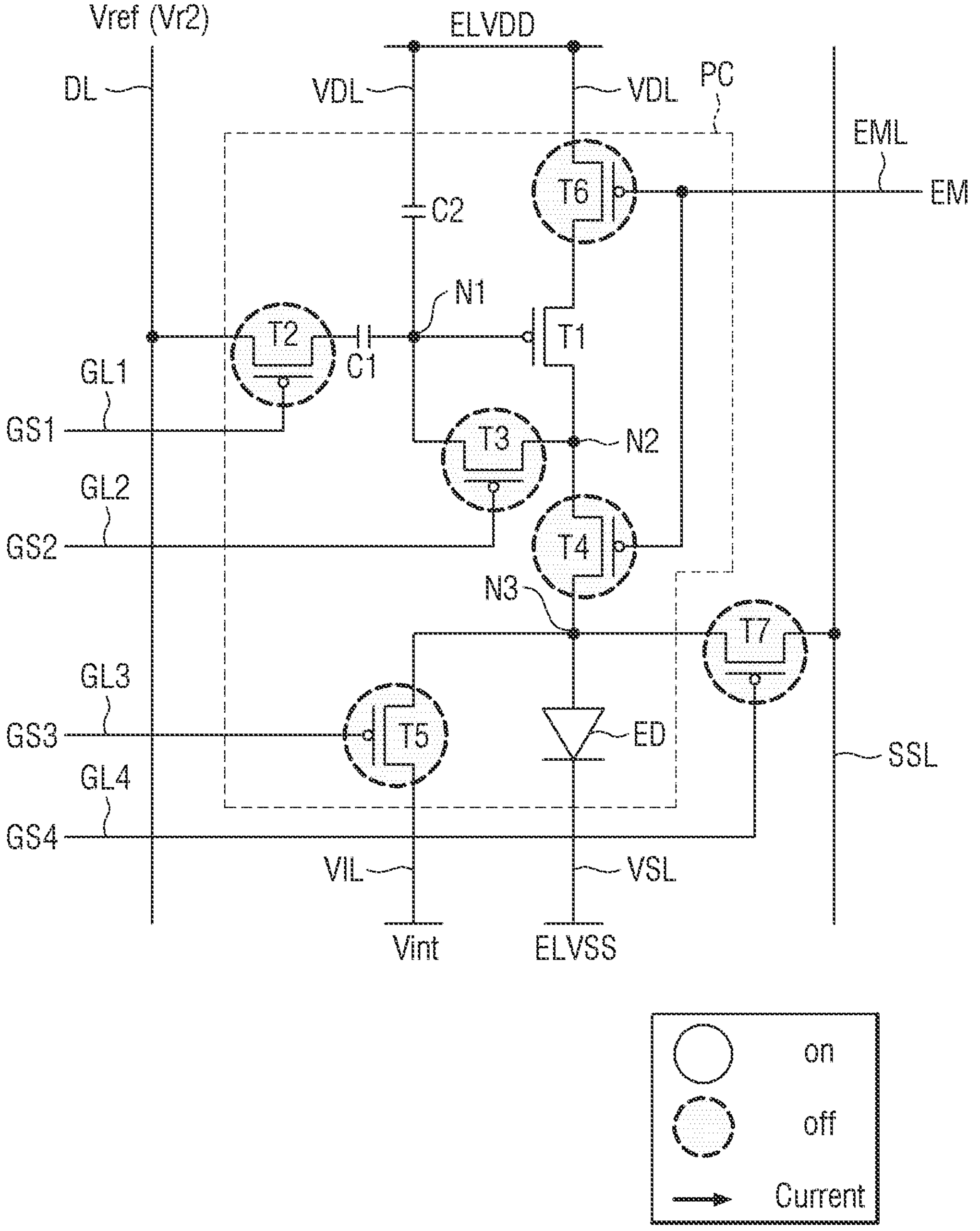
FIG. 25 illustrates operation of the display device of FIG. 21 in the off period of FIG. 22.

Operations of a display device according to an embodiment of the present disclosure will be described with reference to FIGS. 22 to 25. In FIGS. 23 to 25, a transistor surrounded by a circle of a relatively thick line indicates that the transistor is turned on. On the other hand, a transistor surrounded by a dashed circle indicates that the transistor is turned off. In addition, arrows in FIGS. 23 to 25 indicate current flows. The display device of FIGS. 23 to 25 may be operational or may be defective, e.g., may not include an emissive layer. For example, the light-emitting element of the display device of FIGS. 23 to 25 may include an anode electrode and not include an emissive layer or a cathode electrode. In other words, the light-emitting element of the display device of FIGS. 23 to 25 receiving the signals according to FIG. 22 may include a pixel electrode but no emissive layer or no common electrode.

Operation of the display device in the initialization period P1 will be described with reference to FIGS. 22 and 23. FIG. 23 illustrates an operation of the display device in the initialization period P1 of FIG. 22.

As shown in FIG. 22, in the second subsidiary period S2 of the initialization period P1, the emission signal EM, the first gate signal GS1, the second gate signal GS2 and the fourth gate signal GS4 may each have the active level, and the third gate signal GS3 may have the non-active level. In addition, in the second subsidiary period S2, the reference voltage Vref may have the level of the first voltage Vr1.

As shown in FIG. 23, the first gate signal GS1 at the active level may be applied to the gate electrode of the second transistor T2 through the first gate line GL1. Accordingly, the second transistor T2 may be turned on.

As shown in FIG. 23, the second gate signal GS2 at the active level may be applied to the gate electrode of the fourth transistor T4 through the second gate line GL2. Accordingly, the fourth transistor T4 may be turned on.

As shown in FIG. 23, the third gate signal GS3 at the non-active level may be applied to the gate electrode of the fifth transistor T5 through the third gate line GL3. Accordingly, the fifth transistor T5 may be turned on.

As shown in FIG. 23, the fourth gate signal GS4 at the active level may be applied to the gate electrode of the sixth transistor T6 through the fourth gate line GL4. Accordingly, the sixth transistor T6 may be turned off.

As shown in FIG. 23, the emission signal EM at the active level may be applied to the gate electrode of the third transistor T3 and the gate electrode of the seventh transistor T7 through the emission line EML. Accordingly, each of the third transistor T3 and the seventh transistor T7 may be turned on.

As the second transistor T2, the sixth transistor T6, the seventh transistor T7, the fourth transistor T5 and the third transistor T3 are turned on during the initialization period P1, the gate electrode of the first transistor T1 (e.g., the first node N1), the source electrode of the first transistor T1, and the drain electrode of the first transistor T1 (e.g., the node N3A) may be initialized. For example, the first voltage Vr1 from the data line DL may be applied through the turned-on second transistor T2 and the first capacitor C1' to the first node N1, which is the gate electrode of the first transistor T1. In addition, the supply voltage ELVDD from the driving voltage line VDL may be applied to the source electrode of the first transistor T1 through the turned-on third transistor T3. In addition, the initialization voltage Vinit from the initialization line VIL may be applied through the turned-on fourth transistor T4 and seventh transistor T7 to the node N3A, which is the drain electrode of the first transistor T1. Accordingly, the voltage of each of the gate electrode of the first transistor T1, the source electrode of the first transistor T1, and the drain electrode of the first transistor T1 may be initialized. For example, the gate electrode of the first transistor T1 may be initialized to the first voltage Vr1 of the reference voltage Vref, the source electrode of the first transistor T1 may be initialized to the supply voltage ELVDD, and the drain electrode of the first transistor T1 may be initialized to the initialization voltage Vinit. Incidentally, the node N3B, which is the anode of the light-emitting element ED, may be initialized by the initialization voltage Vinit supplied through the turned-on fourth transistor T4.

In addition, the first transistor T1 is a p-type transistor, and the first voltage Vr1 of the reference voltage Vref applied to the first node N1, which is the gate electrode of the first transistor T1, is less than the supply voltage ELVDD applied to the source electrode of the first transistor T1. Accordingly, during the initialization period P1, the voltage difference between the gate electrode and the source electrode of the first transistor T1 (hereinafter referred to as gate-source voltage) may be a voltage of negative polarity. Accordingly, in the initialization period P1, the first transistor T1 may be turned on by the gate-source voltage of negative polarity. Therefore, a current path may be generated between the driving voltage line VDL and the initialization line VIL through the turned-on first transistor T1. The voltages of the source and drain electrodes of the first transistor T1 may also be initialized by the current flowing along the current path.

Operation of the display device in the sensing period P2 will be described with reference to FIGS. 22 and 24. FIG. 24 illustrates an operation of the display device in the sensing period P2 of FIG. 22.

As shown in FIG. 22, in the sensing period P2, the emission signal EM and the third gate signal GS3 may each have the active level, while the first gate signal GS1, the second gate signal GS2 and the fourth gate signal GS4 may each have the non-active level. In addition, in the sensing period P3, the reference voltage Vref may have the level of the first voltage Vr1.

As shown in FIG. 24, the first gate signal GS1 at the non-active level may be applied to the gate electrode of the second transistor T2 through the first gate line GL1. Accordingly, the second transistor T2 may be turned off.

As shown in FIG. 24, the second gate signal GS2 at the non-active level may be applied to the gate electrode of the fourth transistor T4 through the second gate line GL2. Accordingly, the fourth transistor T4 may be turned off.

As shown in FIG. 24, the third gate signal GS3 at the active level may be applied to the gate electrode of the fifth transistor T5 through the third gate line GL3. Accordingly, the fifth transistor T5 may be turned on.

As shown in FIG. 24, the fourth gate signal GS4 at the non-active level may be applied to the gate electrode of the sixth transistor T6 through the fourth gate line GL4. Accordingly, the sixth transistor T6 may be turned off.

As shown in FIG. 24, the emission signal EM at the active level may be applied to the gate electrode of the third transistor T3 and the gate electrode of the seventh transistor T7 through the emission line EML. Accordingly, each of the third transistor T3 and the seventh transistor T7 may be turned on.

As the second transistor T2 is turned off, the first node N1, which is the gate electrode of the first transistor T1, may be electrically floating, and the first voltage Vr1 of the reference voltage Vref applied during a previous period (e.g., the initialization period P1) may be maintained at the floating first node N1. At this time, the first voltage Vr1 of the first node N1 may be maintained by the first capacitor C1' and the second capacitor C2'. By the reference voltage Vref maintained by the first capacitor C1' and the second capacitor C2', the first transistor T1 can remain turned on.

As described above, as the third transistor T3, the first transistor T1, the seventh transistor T7 and the fifth transistor T5 are turned on, a current path may be formed between the driving voltage line VDL and the sensing line SSL through the third transistor T3, the first transistor T1, the seventh transistor T7, and the fifth transistor T5. Therefore, a current (e.g., sensing current) flowing along the driving voltage line VDL, the third transistor T3, the first transistor T1, the seventh transistor T7, the fifth transistor T5 and the sensing line SSL may be formed. This sensing current may be provided to the detector 230 through the sensing line SSL. The detector 230 may receive the sensing current flowing through the third transistor T3, the first transistor T1, the seventh transistor T7, and the fifth transistor T5 via the sensing line SSL and may determine whether the pixel PX is defective based on the received sensing current. The operation of the detector 230 for determining whether a pixel is defective has been described above with reference to FIG. 9.

Operation of the display device in the off period P3 will be described with reference to FIGS. 22 and 25. FIG. 25 illustrates an operation of the display device in the off period P3 of FIG. 22.

As shown in FIG. 22, in the off period P3, the emission signal EM, the first gate signal GS1, the second gate signal GS2, the third gate signal GS3 and the fourth gate signal GS4 may each have the non-active level. In addition, in the off period P3, the reference voltage Vref may have a level of the second voltage Vr2.

As shown in FIG. 25, the first gate signal GS1 at the non-active level may be applied to the gate electrode of the second transistor T2 through the first gate line GL1. Accordingly, the second transistor T2 may be turned off.

As shown in FIG. 25, the second gate signal GS2 at the non-active level may be applied to the gate electrode of the fourth transistor T4 through the second gate line GL2. Accordingly, the fourth transistor T4 may be turned off.

As shown in FIG. 25, the third gate signal GS3 at the non-active level may be applied to the gate electrode of the fifth transistor T5 through the second gate line GL3. Accordingly, the fifth transistor T5 may be turned off.

As shown in FIG. 25, the fourth gate signal GS4 at the non-active level may be applied to the gate electrode of the sixth transistor T6 through the fourth gate line GL4. Accordingly, the sixth transistor T6 may be turned off.

As shown in FIG. 25, the emission signal EM at the non-active level may be applied to the gate electrode of the third transistor T3 and the gate electrode of the seventh transistor T7 through the emission line EML. Accordingly, each of the third transistor T3 and the seventh transistor T7 may be turned off.

As shown in FIG. 25, the first transistor T1 may be turned off.

Pixels in one column commonly connected to one sensing line may be sequentially connected to the sensing line. For example, as shown in FIG. 5, a plurality of pixels PX in the first column CL1 may be sequentially connected to a first sensing line SSL1. Specifically, let us define three pixels PX in the first column as a first pixel, a second pixel and a third pixel in the reverse order in the second direction DR2 from the top side. If each pixel PX has the structure shown in FIG. 24, the third gate signal GS3 may be first applied to the fifth transistor T5 of the first pixel, then the third gate signal GS3 may be applied to the fifth transistor T5 of the second pixel, and then the third gate signal GS3 may be applied to the fifth transistor T5 of the third pixel in this order. Accordingly, the sensing voltages Vs of the pixels PX of the first column CL1 may be sequentially applied to the first sensing line SSL1.

The display device 10 of the present disclosure may be fabricated to include an emissive layer on a pixel electrode, a common electrode on the emissive layer, an encapsulation layer ENC on the common electrode, and a color filter layer CFL on the encapsulation layer ENC. Performing the above-described inspection process described with reference to FIGS. 21 to 25 may determine whether pixels are defective. Subsequently, the display device including the emissive layer, the common electrode, etc. may operate normally based on the initialization period, the compensation period, and the emission period. The fifth transistor T5 may always remain turned off during normal operation regardless of the period. As an example, the third gate signal GS3 of the third gate line GL3 connected to the gate electrode of the fifth transistor T5 may remain at the non-active level regardless of the period. In other words, the third gate signal GS3 may be a DC signal having a level that can turn off the fifth transistor T5. In addition, a sensing line SS of the display device including the emissive layer, the common electrode, etc. may be connected to the detector 230 or the power supply unit 500 and may receive a DC voltage from the detector 230 or the power supply unit 500.

It should be noted that all of the pixels PX of the display device including the emissive layer and the common electrode may simultaneously receive the third gate signals GS3 at the non-active level.

Figure 26:
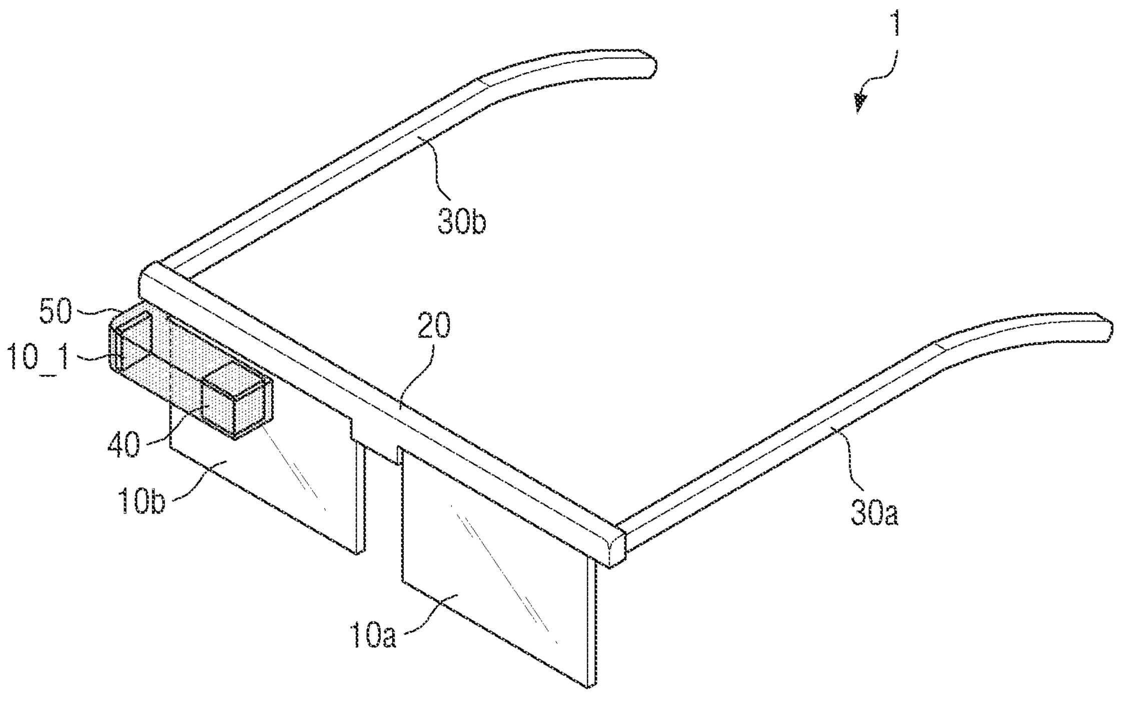
FIG. 26 shows an example of a virtual reality device including a display device according to an embodiment.

FIG. 26 is a view showing an example of a virtual reality device including a display device according to an embodiment. FIG. 26 shows a virtual reality device 1 employing a display device 10_1 according to an embodiment. The display device 10_1 may employ, for example, any of the embodiments described above with reference to FIGS. 1 to 25.

Referring to FIG. 26, the virtual reality device 1 according to the embodiment may be a device in the form of glasses. The virtual reality device 1 according to the embodiment of the present disclosure may include the display device 10_1, a left eye lens 10*a*, a right eye lens 10*b*, a support frame 20, eyeglass temples 30*a* and 30*b*, a reflective member 40, and a display case 50.

Although FIG. 26 shows the virtual reality device 1 including the eyeglass temples 30*a* and 30*b*, a head mounted display with a head strap, instead of the eyeglass temples 30*a* and 30*b*, may be employed as the virtual reality device 1 according to an embodiment of the present disclosure. That is to say, the virtual reality device 1 is not limited to that shown in FIG. 26 but may be applied in a variety of electronic devices in a variety of forms.

The display case 50 may include the display device 10_1 and the reflective member 40. An image displayed on the display device 10_1 may be reflected by the reflective member 40 and provided to the user's right eye through the right eye lens 10*b*. Accordingly, the user may watch a virtual reality image displayed on the display device 10_1 through the user's right eye.

Although the display case 50 is disposed at the right end of the support frame 20 in the example shown in FIG. 26, the embodiments of the present disclosure are not limited thereto. For example, the display case 50 may be disposed at the left end of the support frame 20. In such case, an image displayed on the display device 10_1 may be reflected by the reflective member 40 and provided to the user's left eye through the left eye lens 10*a*. Accordingly, the user may watch a virtual reality image displayed on the display device 10_1 through the left eye. Alternatively, the display cases 50 may be disposed at both the left and right ends of the support frame 20, respectively. In such a case, the user can watch a virtual reality image displayed on the display device 10_1 through both the left and right eyes.

Figure 27:
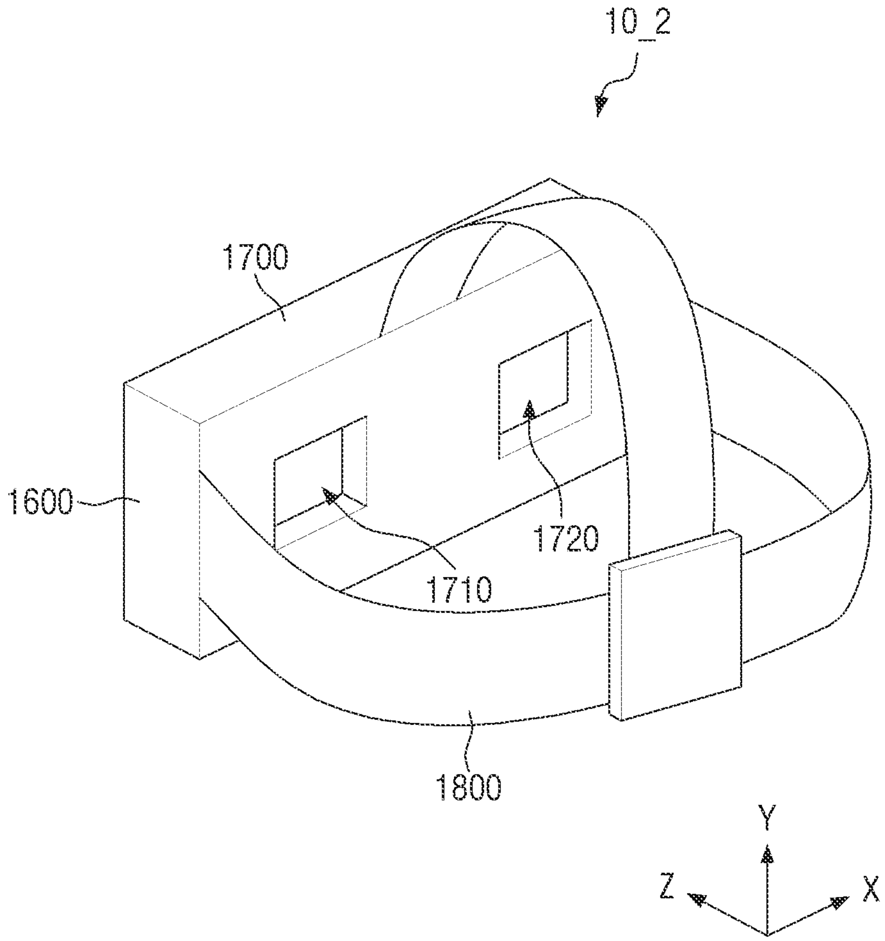
FIGS. 27 and 28 respectively show perspective and exploded views of a head-mounted display device employing a display device according to an embodiment of the present disclosure.
Figure 28:
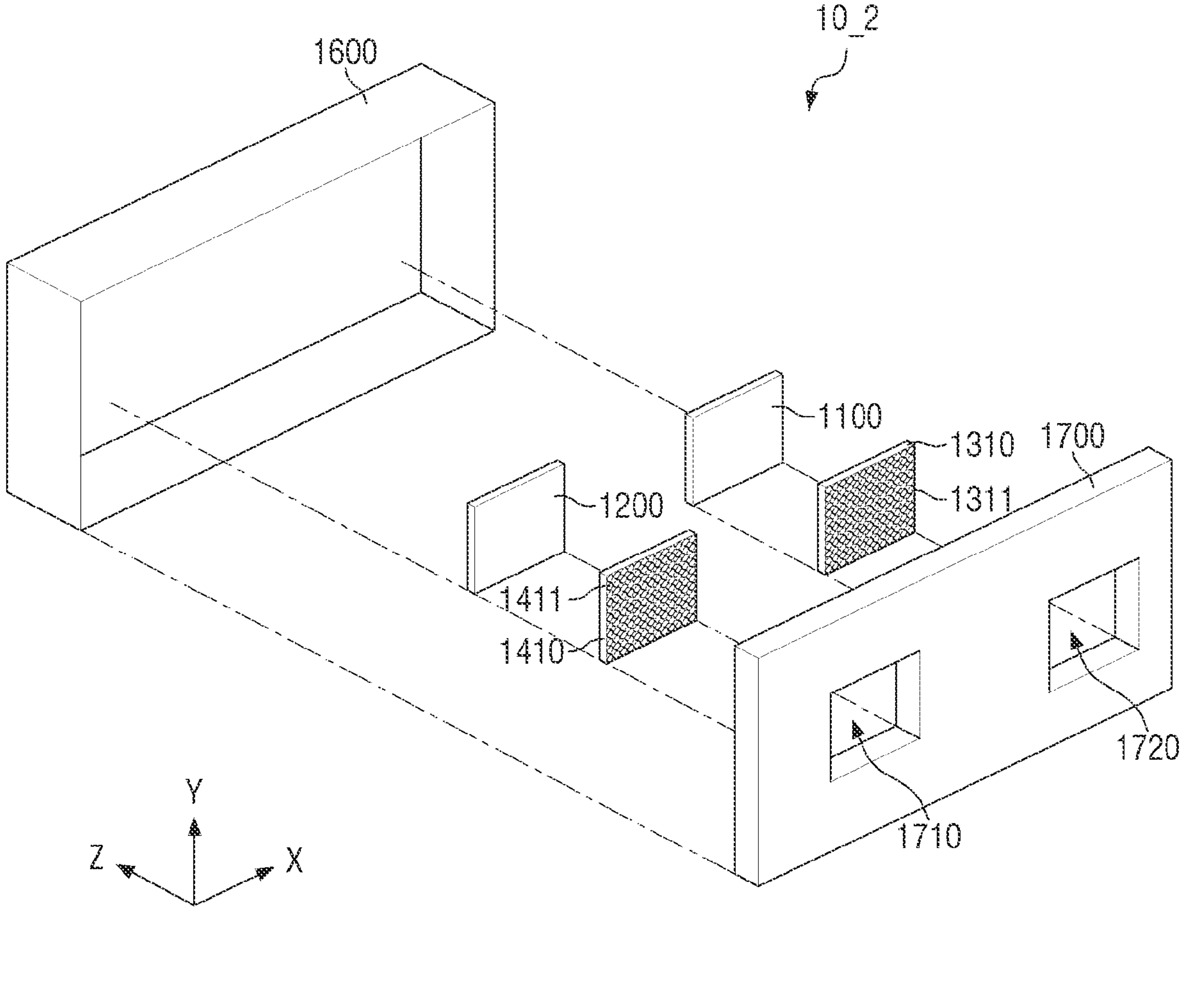

FIGS. 27 and 28 are views showing a head-mounted display device employing a display device according to an embodiment of the present disclosure.

Referring to FIGS. 27 and 28, a display device 10_2 according to an embodiment may be applied to a head-mounted display. A first display device 1100 provides images to the user's right eye, and a second display device 1200 provides images to the user's left eye. The display device 10_2 may include, for example, the elements or features described above with reference to FIGS. 1 to 25.

A first lens array 1310 may be disposed between the first display device 1100 and a case cover 1700. The first lens array 1310 may include a plurality of lenses 1311. The plurality of lenses 1311 may be formed as convex lenses that are convex toward the case cover 1700.

A second lens array 1410 may be disposed between the second display device 1200 and the case cover 1700. The second lens array 1410 may include a plurality of lenses 1411. The plurality of lenses 1411 may be formed as convex lenses that are convex toward the case cover 1700.

A display panel case 1600 may accommodate the first display device 1100, the second display device 1200, the first lens array 1310 and the second lens array 1410. A surface of the case 1600 may be opened in order to accommodate the first display device 1100, the second display device 1200, the first lens array 1310 and the second lens array 1410.

The case cover 1700 is disposed to cover the opened surface of the case 1600. The case cover 1700 may include a first opening 1710 where the user's left eye is located and a second opening 1720 where the user's right eye is located. Although the first opening 1710 and the second opening 1720 are formed in a rectangular shape in the example shown in FIGS. 27 and 28, the present disclosure is not limited thereto. The first opening 1710 and the second opening 1720 may be formed in a circular shape or an elliptical shape. Alternatively, the first opening 1710 and the second opening 1720 may be combined to form a single opening.

The first opening 1710 may be aligned with the first display device 1100 and the first lens array 1310, and the second opening 1720 may be aligned with the second display device 1200 and the second lens array 1410. Therefore, a user may see images on the first display device 1100 magnified by the first lens array 1310 through the first opening 1710, and images on the second display device 1200 magnified by the second lens array 1410 through the second opening 1720.

A head strap band 1800 fixes the case 1600 to the user's head so that the first opening 1710 and the second opening 1720 of the case cover 1700 are in line with the user's left and right eyes, respectively. The head strap band 1800 may be connected to the top, left and right sides of the case 1600.

In concluding the detailed description, those skilled in the art will appreciate that many variations and modifications can be made to the disclosed embodiments without substantially departing from the principles of the present disclosure. Therefore, the disclosed embodiments of the invention are used in a generic and descriptive sense only and not for purposes of limitation.

What is claimed is:

1. A display device comprising:

a light-emitting element;

a driving transistor connected between a driving voltage line and an anode electrode of the light-emitting element;

a second transistor connected between a data line and a gate electrode of the driving transistor;

a third transistor connected between the driving voltage line and a source electrode of the driving transistor;

a first capacitor connected between the gate electrode of the driving transistor and a second node located between the third transistor and the source electrode of the driving transistor;

a fourth transistor between an initialization line and an anode electrode of the light-emitting element and the fourth transistor being directly connected to the anode electrode of the light emitting element; and a fifth transistor connected between the anode electrode of the light-emitting element and a sensing line, wherein the fifth transistor remains turned off during normal operation of the display device, wherein the fifth transistor is turned on during fabrication or testing of the display device.

2. The display device of claim 1, further comprising:

a second capacitor connected between the gate electrode of the driving transistor and the anode electrode of the light-emitting element.

3. The display device of claim 2, further comprising: a first gate line connected to a gate electrode of the second transistor;

an emission line connected to a gate electrode of the third transistor;

a second gate line connected to a gate electrode of the fourth transistor; and a third gate line connected to a gate electrode of the fifth transistor.

4. The display device of claim 3, wherein a third gate signal of the third gate line has a non-active level.

5. The display device of claim 4, wherein in an initialization/write period, an emission signal of the emission line, a first gate signal of the first gate line, and a second gate signal of the second gate line each have an active level, while a third gate signal of the third gate line has a non-active level, wherein in a compensation period, the first gate signal and the second gate signal each have the active level, while the emission signal and the third gate signal each have the non-active level, wherein in a bypass period, the emission signal and the second gate signal each have the active level, while the first gate signal and the third gate signal each have the non-active level, and wherein in an emission period, the emission signal has the active level, while the first gate signal and the second gate signal each have the non-active level.

6. The display device of claim 5, wherein a previous data voltage is applied to the data line in the initialization/write period and the compensation period, wherein a current data voltage is applied to the data line in the emission period, and wherein a transient voltage transitioning from the previous data voltage to the current data voltage is applied to the data line in the bypass period.

7. The display device of claim 1, further comprising:

a detector or a power supply unit connected to the sensing line.

8. A display device comprising:

a light-emitting element;

a driving transistor connected between a driving voltage line and an anode electrode of the light-emitting element;

a second transistor connected between a data line and a gate electrode of the driving transistor;

a third transistor connected between the driving voltage line and a source electrode of the driving transistor;

a first capacitor connected between the gate electrode of the driving transistor and a second node located between the third transistor and the source electrode of the driving transistor;

a fourth transistor connected between an initialization line and the anode electrode of the light-emitting element and the fourth transistor being directly connected to the anode electrode of the light emitting element; and a fifth transistor connected between the anode electrode of the light-emitting element and a sensing line.

9. The display device of claim 8, further comprising:

a second capacitor connected between the gate electrode of the driving transistor and the anode electrode.

10. The display device of claim 8, wherein the fifth transistor always remains turned off.

11. The display device of claim 8, further comprising:

a detector or a power supply unit connected to the sensing line.

* * * * *